(12) United States Patent
Higgins et al.

(10) Patent No.: US 7,182,989 B2
(45) Date of Patent: Feb. 27, 2007

(54) FLOORING SYSTEM AND METHOD

(75) Inventors: Kenneth B Higgins, LaGrange, GA (US); N. David Sellman, Jr., LaGrange, GA (US); William Tippett, Ormskirk (GB)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/209,050

(22) Filed: Jul. 31, 2002

(65) Prior Publication Data

US 2004/0022991 A1     Feb. 5, 2004

(51) Int. Cl.
*B32B 3/02* (2006.01)
*B32B 3/10* (2006.01)
*B32B 3/14* (2006.01)
*B32B 33/00* (2006.01)

(52) U.S. Cl. .................. 428/51; 428/88; 428/44; 428/47; 428/48; 428/82; 428/92; 428/95

(58) Field of Classification Search .......... 428/88, 428/95, 48, 51, 62, 81, 82, 45, 80, 44, 47, 428/92; D6/582; D25/138
See application file for complete search history.

(56) References Cited

U.S. PATENT DOCUMENTS

| | | | | |
|---|---|---|---|---|
| 708,470 A * | 9/1902 | Flood | ................. | 52/590.1 |
| 1,158,051 A * | 10/1915 | Hopkinson | ................. | 428/44 |
| 2,563,478 A | 8/1951 | Mason et al. | ............. | 154/126.5 |
| 2,952,577 A | 9/1960 | Goldstone | ............. | 154/49 |
| 3,034,942 A | 5/1962 | Heiks | ............. | 154/49 |
| 3,120,083 A | 2/1964 | Dahlberg et al. | ............. | 50/413 |
| 3,123,508 A | 3/1964 | Waugh | ............. | 156/78 |
| 3,166,455 A | 1/1965 | Levitch | ............. | 156/88 |
| 3,227,574 A | 1/1966 | Mohr | ............. | 117/45 |
| 3,238,595 A | 3/1966 | Schwartz et al. | ............. | 28/74 |
| 3,309,259 A | 3/1967 | Schwartz | ............. | 428/97 |
| 3,496,035 A | 2/1970 | Foerster | ............. | 148/32.5 |
| 3,518,102 A | 6/1970 | Mertgen et al. | ............. | 117/10 |
| 3,519,526 A | 7/1970 | Carey et al. | ............. | 156/79 |

(Continued)

FOREIGN PATENT DOCUMENTS

CH       476 891        8/1969

(Continued)

OTHER PUBLICATIONS

L. Shoshkes, Contract Carpeting, 1974, Watson-Guptill Publications, pp. 22-26 and 140.*

(Continued)

*Primary Examiner*—Cheryl A. Juska
(74) *Attorney, Agent, or Firm*—Terry T. Moyer; Daniel R. Alexander

(57) ABSTRACT

A flooring system for use in a residential environment. The flooring system includes a subfloor adapted to support the mass of a user and modular surface covering elements for disposition in edge to edge covering arrangement across at least a portion of the subfloor. The modular surface covering elements include a pile fabric face with an arrangement of yarns projecting outwardly defining a pile layer for contact by a user. At least one layer of cushioning material is disposed in contacting relation at a position below the pile fabric face.

4 Claims, 21 Drawing Sheets

U.S. PATENT DOCUMENTS

| | | | | |
|---|---|---|---|---|
| 3,537,946 A | | 11/1970 | Truax et al. | 161/66 |
| 3,560,284 A | | 2/1971 | Wisotzky et al. | 156/72 |
| 3,616,138 A | | 10/1971 | Wentworth | 161/67 |
| 3,649,325 A | | 3/1972 | Affeldt | 117/11 |
| 3,654,051 A | * | 4/1972 | Bieler | 428/44 |
| 3,664,863 A | | 5/1972 | Dijkhuizen et al. | 117/161 |
| 3,723,213 A | | 3/1973 | Hoey | 156/72 |
| 3,808,760 A | | 5/1974 | Ward | 52/221 |
| 3,857,749 A | * | 12/1974 | Yoshida | 428/80 |
| 3,874,964 A | | 4/1975 | Cogliano et al. | 156/78 |
| 3,895,149 A | | 7/1975 | Sheffler et al. | 428/94 |
| 3,926,700 A | | 12/1975 | Hopkins, Jr. et al. | 428/95 |
| 3,940,525 A | | 2/1976 | Ballard | 428/96 |
| 4,010,301 A | | 3/1977 | Anderson et al. | 428/95 |
| 4,061,804 A | * | 12/1977 | McCulloch | 428/17 |
| 4,132,817 A | | 1/1979 | Tillotson | 427/244 |
| 4,171,395 A | | 10/1979 | Tillotson | 428/95 |
| 4,172,168 A | | 10/1979 | Klaffke et al. | 428/138 |
| 4,242,389 A | | 12/1980 | Howell | 428/40 |
| 4,286,003 A | | 8/1981 | Higgins et al. | 428/95 |
| 4,296,159 A | | 10/1981 | Jenkines et al. | 428/95 |
| 4,374,884 A | | 2/1983 | Kwok et al. | 428/95 |
| 4,405,393 A | | 9/1983 | Tillotson | 156/78 |
| 4,405,674 A | | 9/1983 | Kyle | 428/96 |
| 4,512,831 A | | 4/1985 | Tillotson | 156/78 |
| 4,515,846 A | | 5/1985 | McKinney et al. | 428/95 |
| 4,522,857 A | * | 6/1985 | Higgins | 428/95 |
| 4,556,602 A | | 12/1985 | Williams | 428/259 |
| 4,571,353 A | * | 2/1986 | Gable, Jr. | 428/33 |
| 4,578,132 A | | 3/1986 | Van Uden et al. | 156/72 |
| 4,579,763 A | | 4/1986 | Mitman | 428/95 |
| 4,629,642 A | | 12/1986 | Kernstock | 428/95 |
| 4,657,790 A | | 4/1987 | Wing et al. | 427/374.1 |
| 4,661,380 A | | 4/1987 | Tillotson | 427/207.1 |
| 4,689,256 A | | 8/1987 | Slosberg et al. | 428/95 |
| 4,696,849 A | | 9/1987 | Mobley et al. | 428/95 |
| 4,737,221 A | | 4/1988 | Bell et al. | 156/231 |
| 4,798,644 A | | 1/1989 | Scott et al. | 156/324 |
| 4,853,054 A | | 8/1989 | Turner et al. | 156/78 |
| 4,865,688 A | | 9/1989 | Cross et al. | 156/78 |
| 4,915,999 A | | 4/1990 | Tillotson | 428/95 |
| 4,942,072 A | | 7/1990 | Chung | 428/48 |
| 4,942,074 A | | 7/1990 | Bell et al. | 428/95 |
| 4,991,307 A | | 2/1991 | Higgins | 33/526 |
| 5,024,840 A | | 6/1991 | Blakely et al. | 424/404 |
| 5,030,497 A | | 7/1991 | Claessen | 428/95 |
| 5,045,389 A | | 9/1991 | Campagna | 428/316.6 |
| 5,077,874 A | | 1/1992 | Trask et al. | 28/115 |
| 5,104,693 A | | 4/1992 | Jenkines | 427/244 |
| 5,114,773 A | | 5/1992 | Bogdany | 428/95 |
| 5,160,770 A | | 11/1992 | Hoopengardner | 428/40 |
| 5,198,277 A | | 3/1993 | Hamilton et al. | 428/92 |
| 5,204,155 A | | 4/1993 | Bell et al. | 428/95 |
| 5,219,620 A | | 6/1993 | Potter et al. | 427/434.2 |
| 5,252,375 A | | 10/1993 | Turbak et al. | 428/96 |
| 5,330,806 A | * | 7/1994 | Bythewood et al. | 428/33 |
| 5,366,161 A | | 11/1994 | Potter et al. | 239/455 |
| 5,380,561 A | | 1/1995 | Dorn | 427/430.1 |
| RE34,951 E | | 5/1995 | Slosberg et al. | 428/95 |
| 5,538,776 A | | 7/1996 | Corbin et al. | 428/95 |
| 5,540,968 A | | 7/1996 | Higgins | 428/95 |
| 5,545,276 A | * | 8/1996 | Higgins | 156/79 |
| 5,560,972 A | | 10/1996 | Blakely et al. | 428/95 |
| 5,567,256 A | | 10/1996 | Queen et al. | 156/72 |
| 5,610,207 A | | 3/1997 | De Simone et al. | 523/218 |
| 5,612,113 A | | 3/1997 | Irwin, Sr. | 428/95 |
| 5,616,200 A | | 4/1997 | Hamilton et al. | 156/72 |
| 5,646,195 A | | 7/1997 | Mobley | 521/121 |
| 5,763,001 A | | 6/1998 | Brown | 427/140 |
| 5,763,040 A | | 6/1998 | Murphy et al. | 428/96 |
| 5,804,273 A | | 9/1998 | Drake, Jr. et al. | 428/86 |
| 5,902,663 A | | 5/1999 | Justesen et al. | 428/95 |
| 5,908,701 A | | 6/1999 | Jennings et al. | 428/423.1 |
| 5,929,145 A | | 7/1999 | Higgins et al. | 524/69 |
| 5,948,500 A | | 9/1999 | Higgins | 428/95 |
| 6,040,381 A | | 3/2000 | Jennings et al. | 524/871 |
| 6,096,401 A | | 8/2000 | Jenkines | 428/95 |
| 6,162,309 A | | 12/2000 | Brodeur, Jr. et al. | 156/72 |
| 6,162,748 A | | 12/2000 | Schilling et al. | 442/226 |
| 6,197,400 B1 | * | 3/2001 | Desai | 428/88 |
| 6,203,879 B1 | | 3/2001 | Desai | |
| 6,203,881 B1 | | 3/2001 | Higgins | 428/95 |
| D456,858 S | * | 5/2002 | Huntsberger | D21/433 |
| D479,424 S | * | 9/2003 | Sellman, Jr. | D6/582 |
| D481,577 S | * | 11/2003 | Sellman, Jr. | D6/582 |
| D481,578 S | * | 11/2003 | Sellman, Jr. | D6/582 |
| D492,426 S | * | 6/2004 | Strickler | D25/162 |
| 6,838,147 B2 | | 1/2005 | Burns, Jr. et al. | 428/95 |
| 2003/0114062 A1 | | 6/2003 | Scott et al. | 422/181 |
| 2003/0157295 A1 | | 8/2003 | Burns, Jr. et al. | 428/94 |
| 2004/0062899 A1 | | 4/2004 | Kobayashi et al. | 428/48 |

FOREIGN PATENT DOCUMENTS

| | | |
|---|---|---|
| DE | 1 560 755 | 10/1970 |
| DE | 2 310 970 | 9/1974 |
| DE | 2557719 | 6/1977 |
| DE | 30 49 063 A1 | 12/1980 |
| EP | 0 005 050 | 10/1979 |
| EP | 0 048 986 | 4/1982 |
| EP | 0268875 | 6/1988 |
| EP | 0 309 816 | 4/1989 |
| FR | 2 303 136 | 10/1976 |
| GB | 1 338 030 | 6/1972 |
| GB | 2 042 368 | 9/1980 |
| GB | 2 256 614 | 12/1992 |
| GB | 2 369 294 | 11/2001 |
| JP | 1-247654 | 10/1989 |
| JP | 9-85825 A | 3/1997 |
| NL | 8203180 | 3/1984 |
| WO | 87/01656 | 3/1987 |
| WO | 95/23691 | 9/1995 |

OTHER PUBLICATIONS

Lila Shoshke "Contract Carpeting", 1974 Whitney Library of Design, pp. 22-26 and 140.

Lila Shoshke "Contract Carpeting", 1974 Whitney Library of Design, pp. 32-46.

* cited by examiner

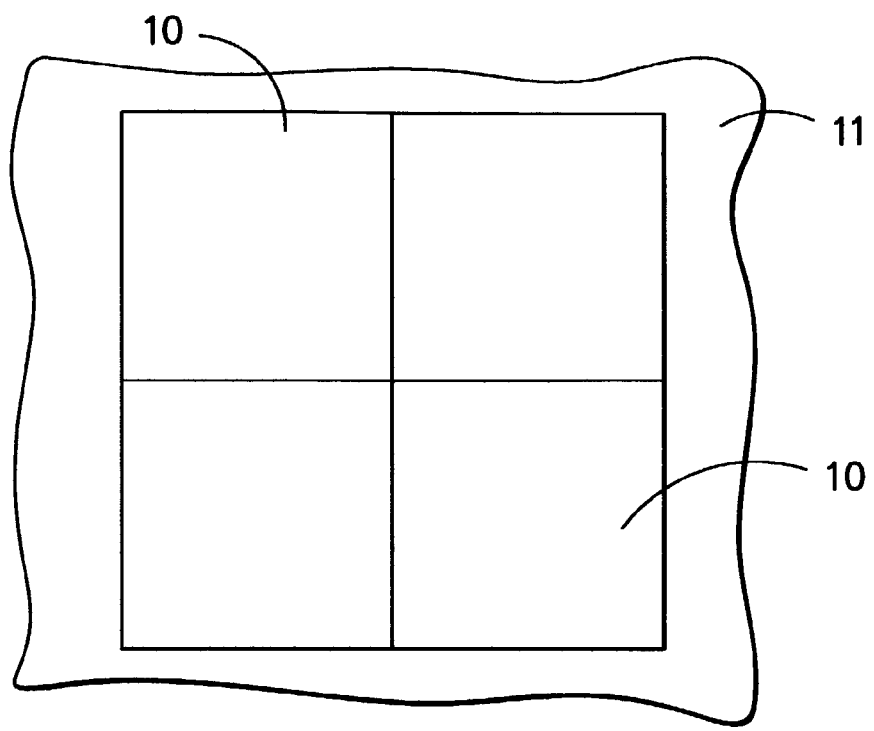
FIG. -1-
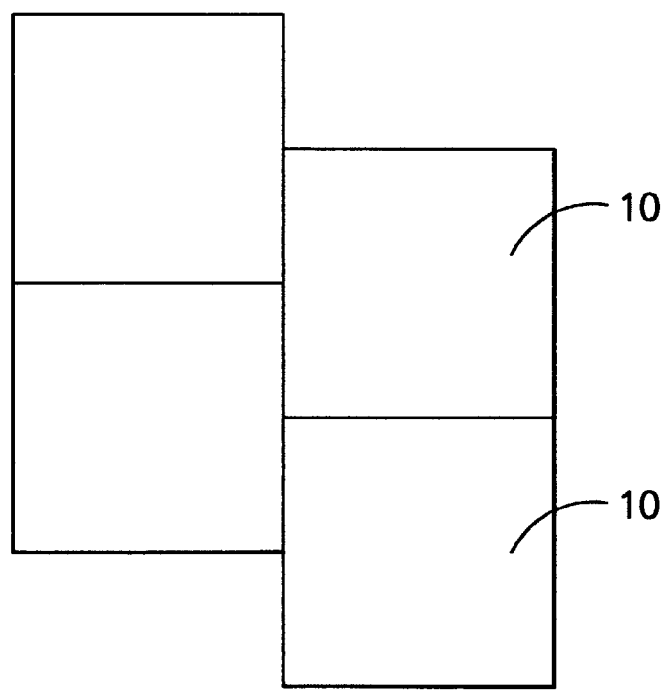
FIG. -2-

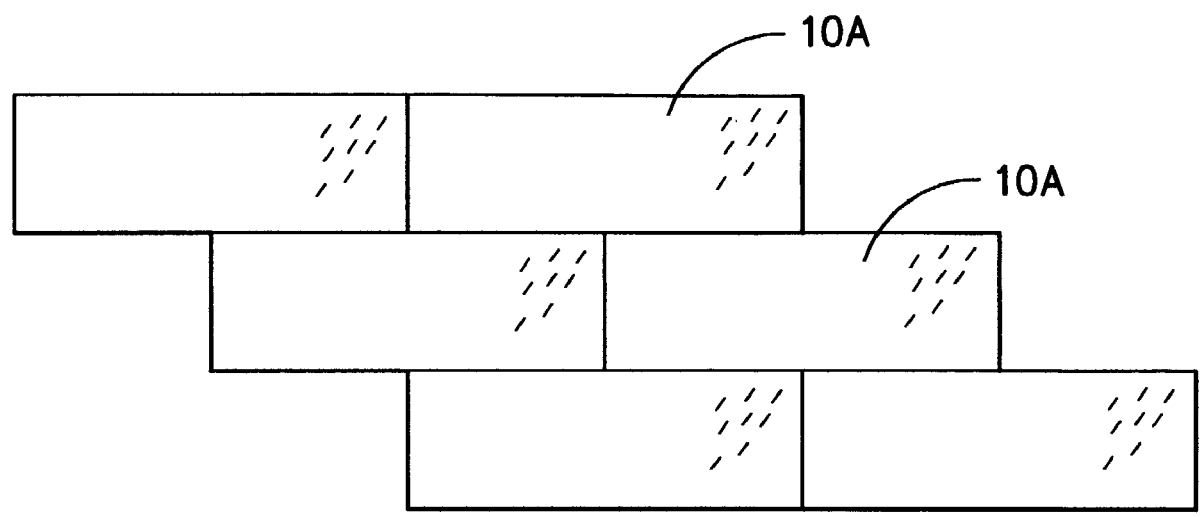
FIG. -3-
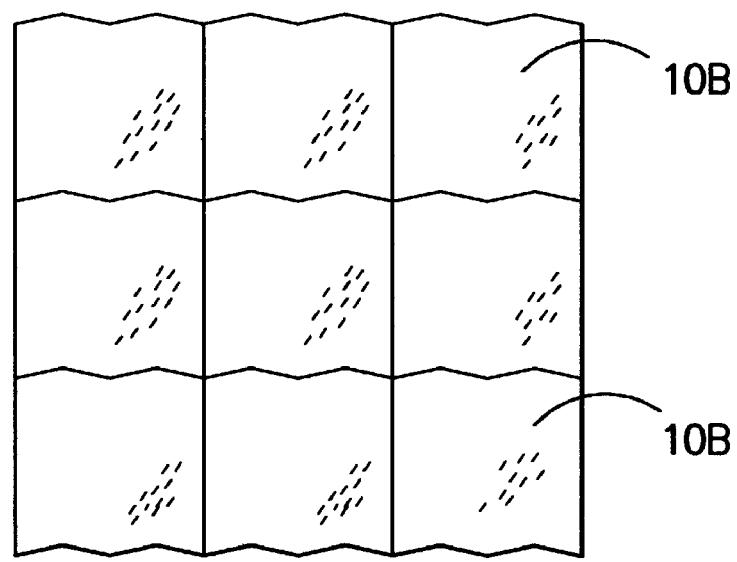
FIG. -4-

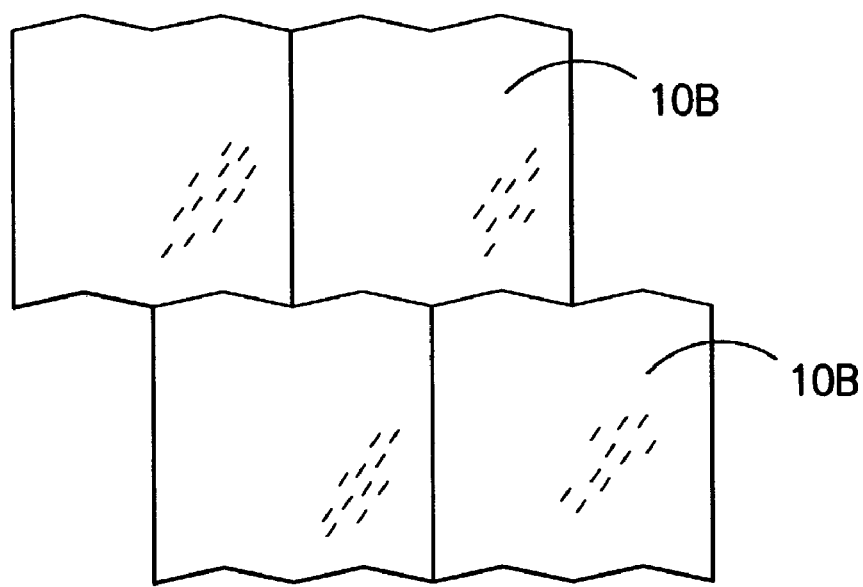
FIG. -5-
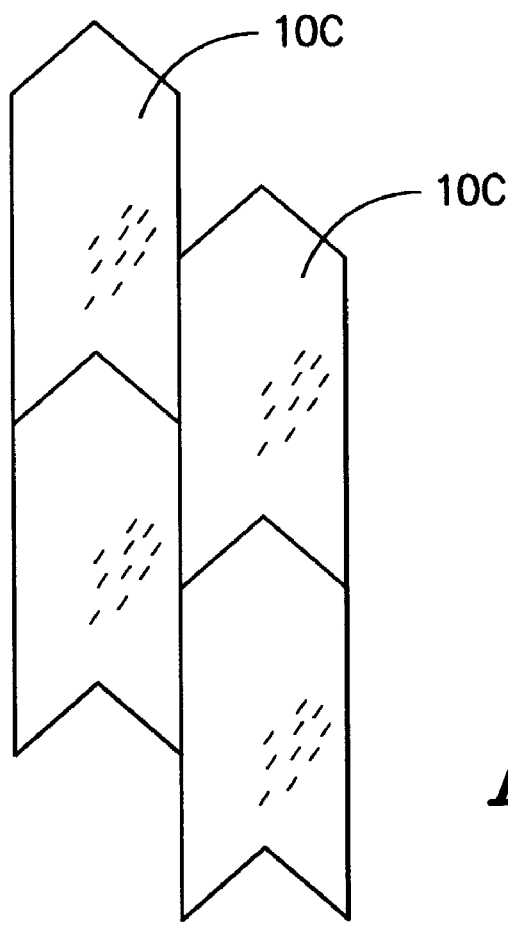
FIG. -6-

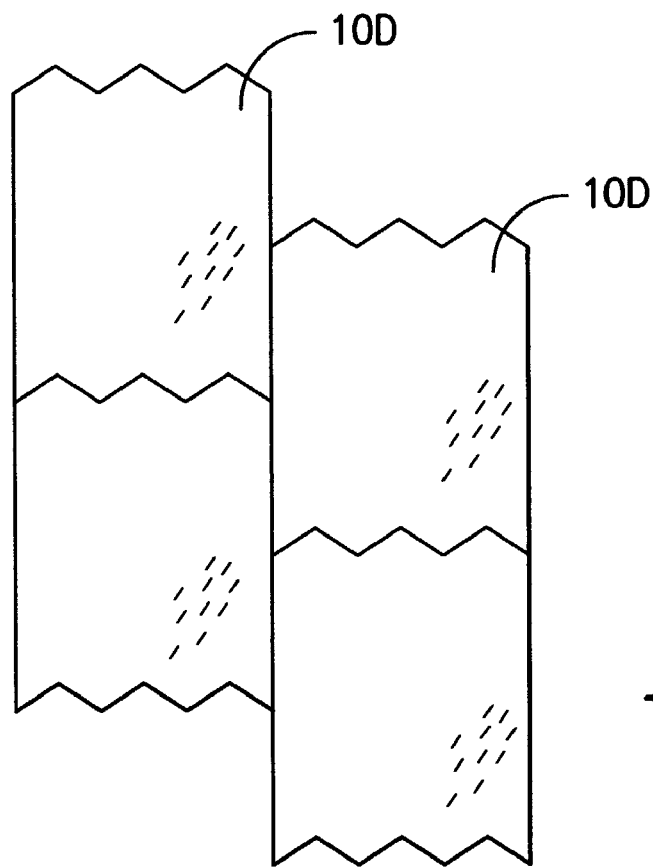
FIG. -7-
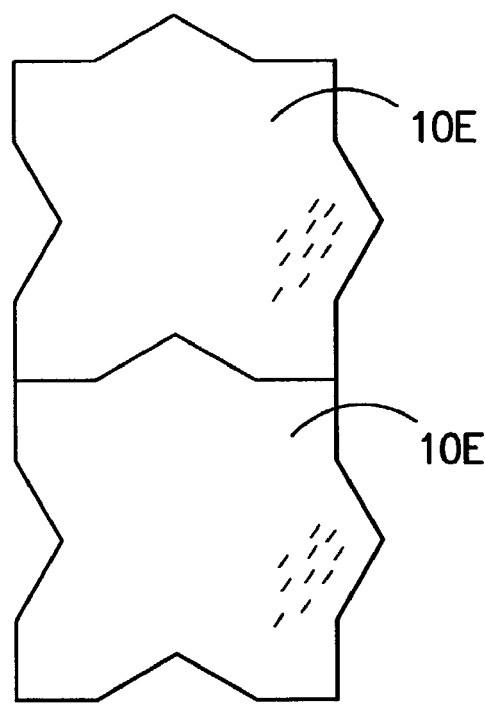
FIG. -8-

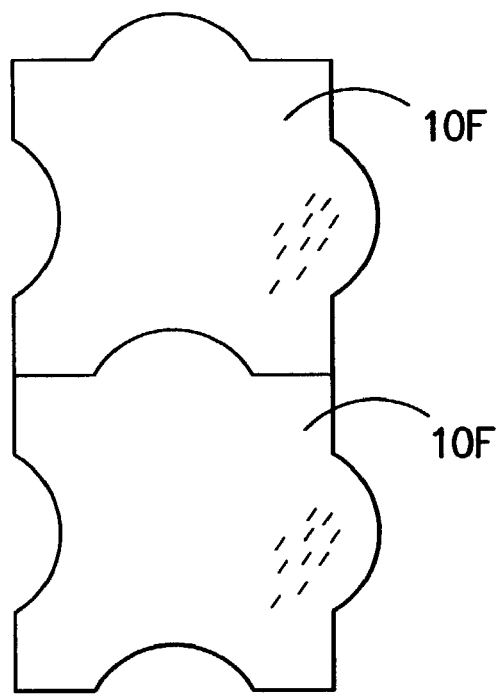
FIG. -9-
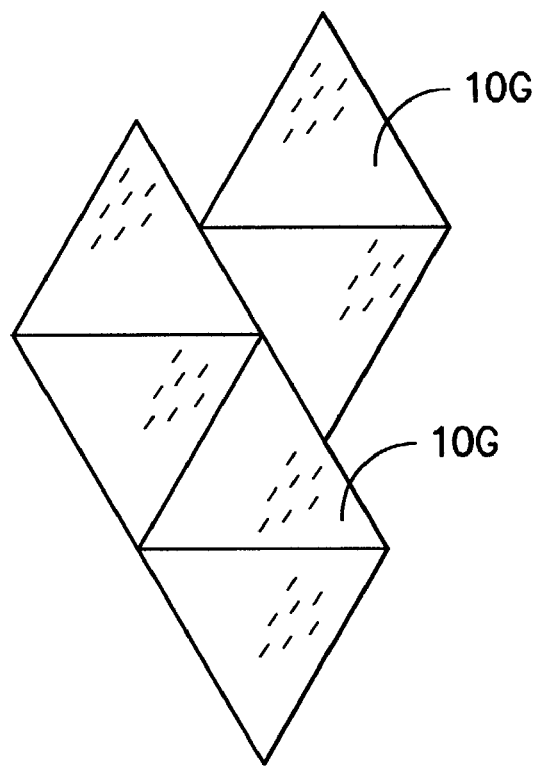
FIG. -10-

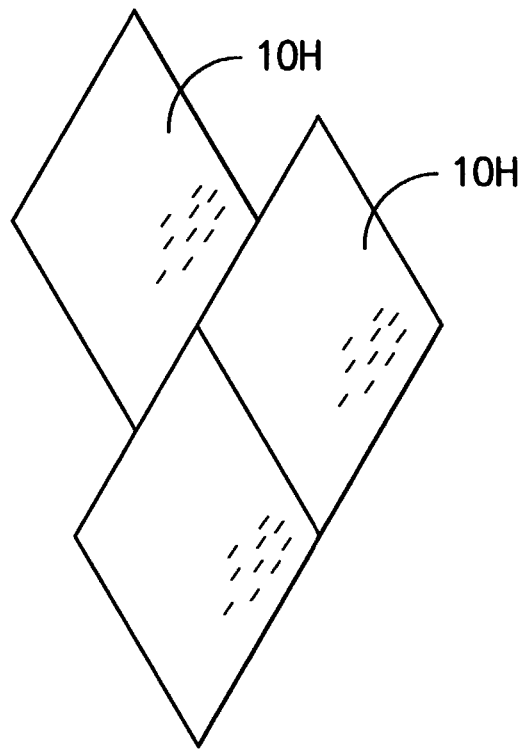
FIG. -11-
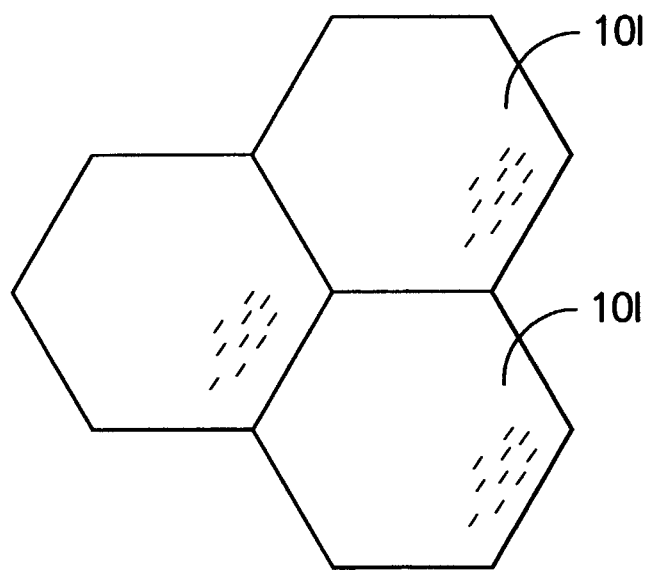
FIG. -12-

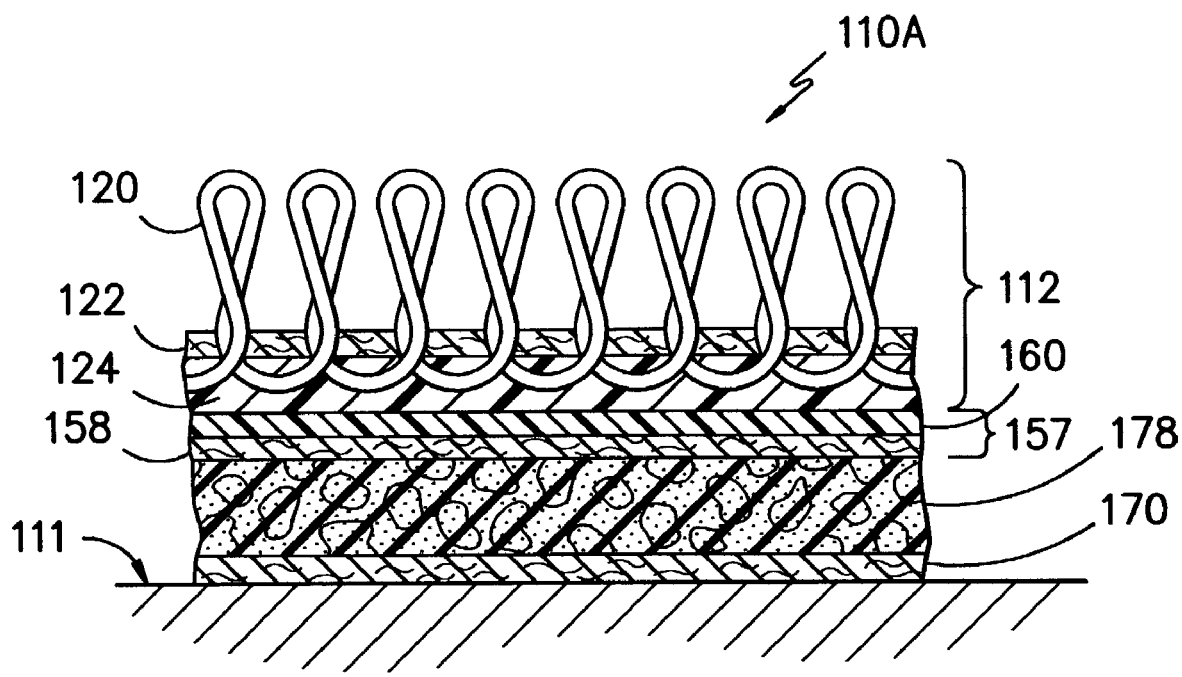
FIG. -13A-
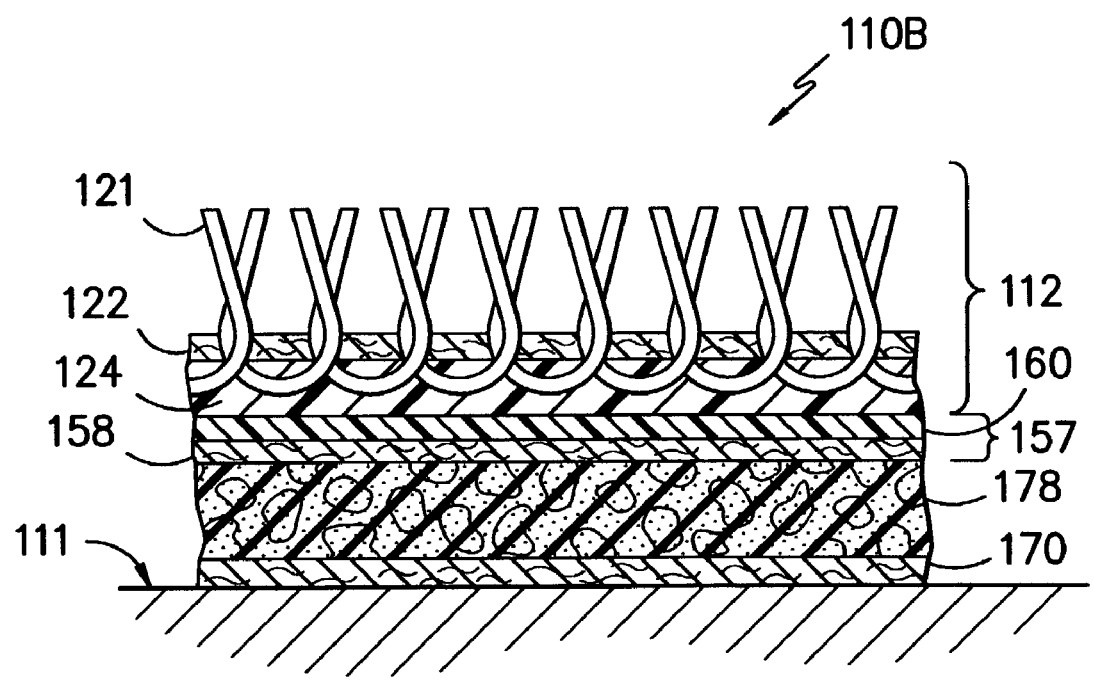
FIG. -13B-

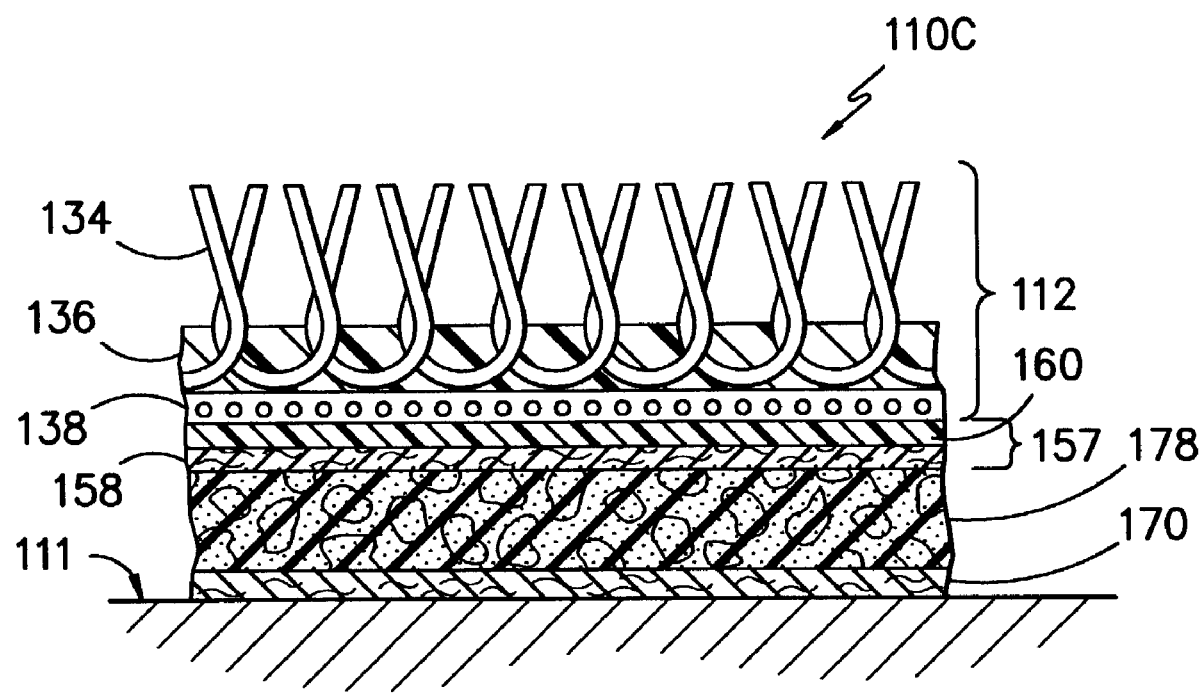
FIG. -13C-
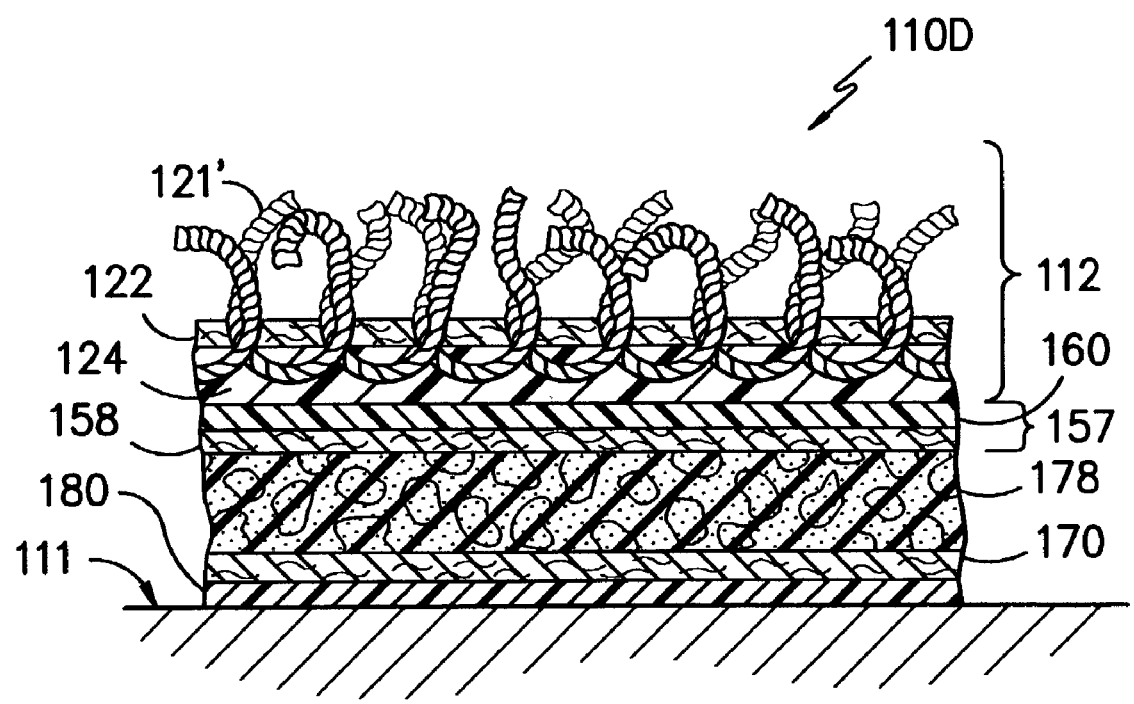
FIG. -13D-

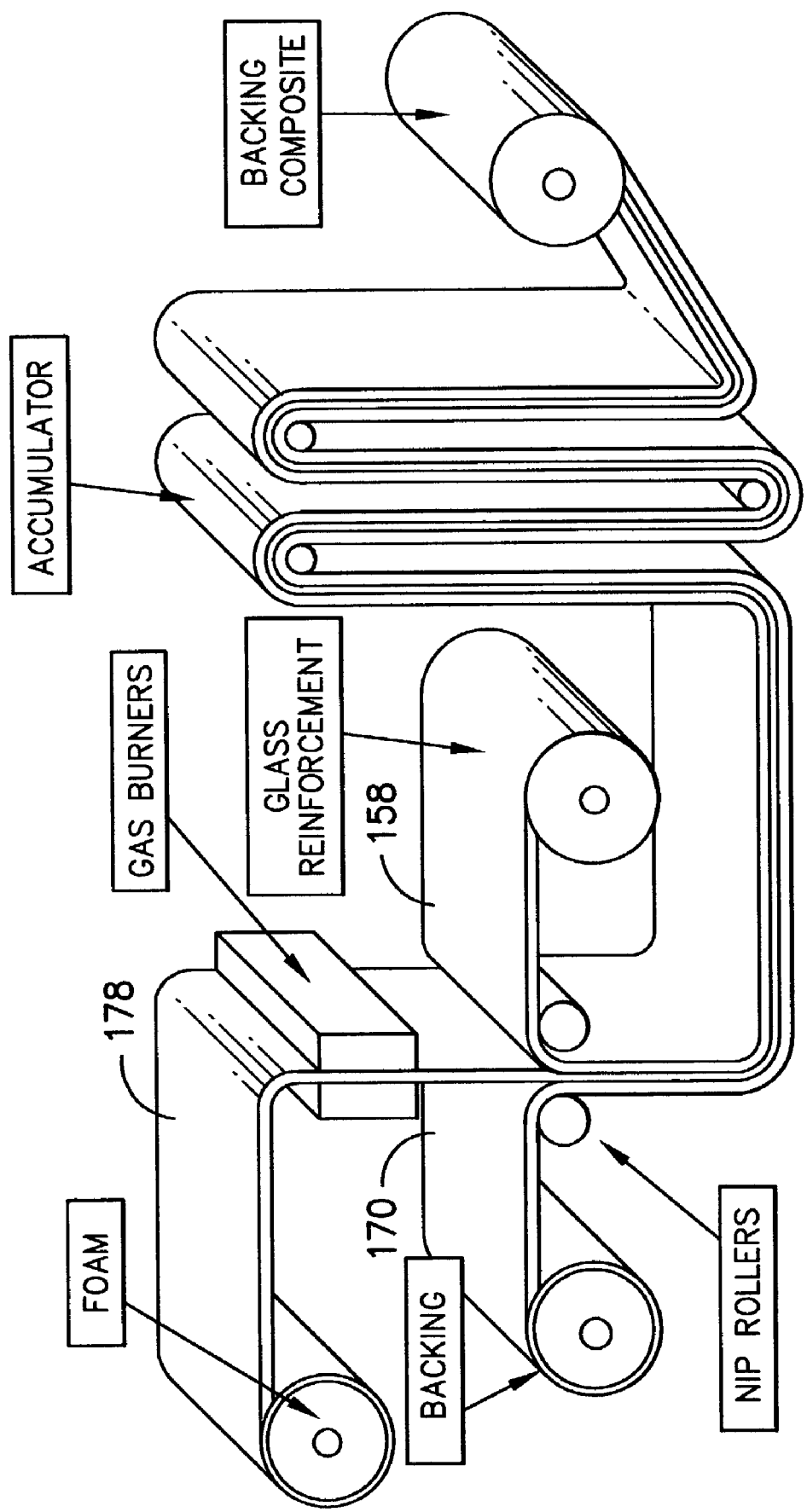
FIG. -14A-

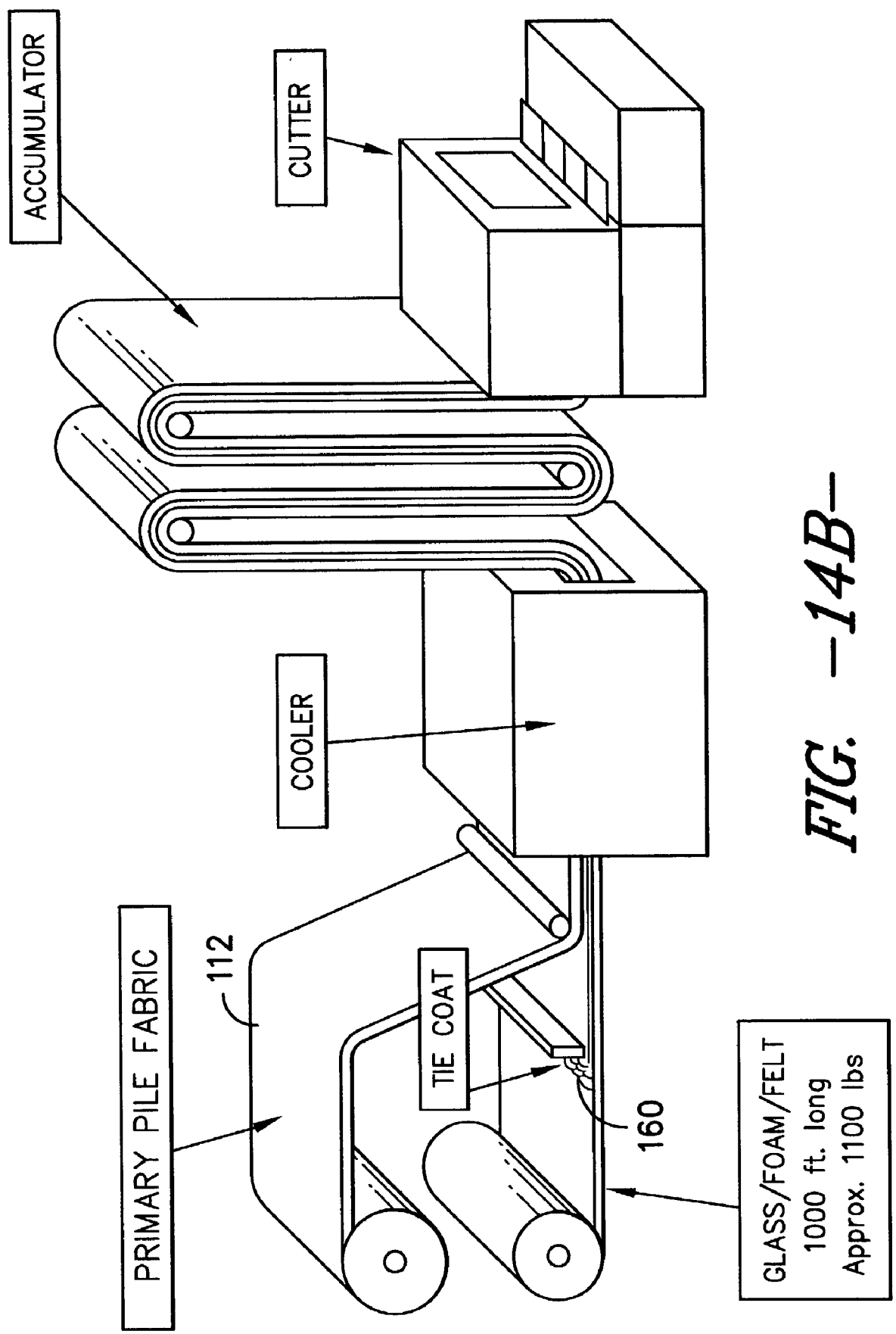
FIG. -14B-

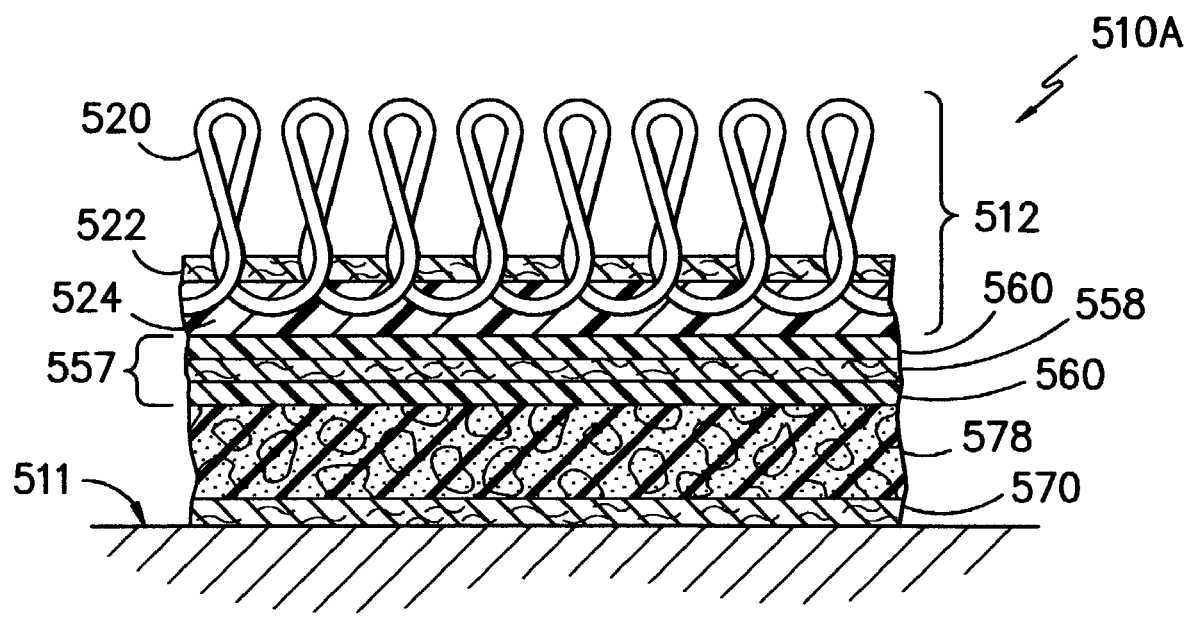
FIG. -15A-
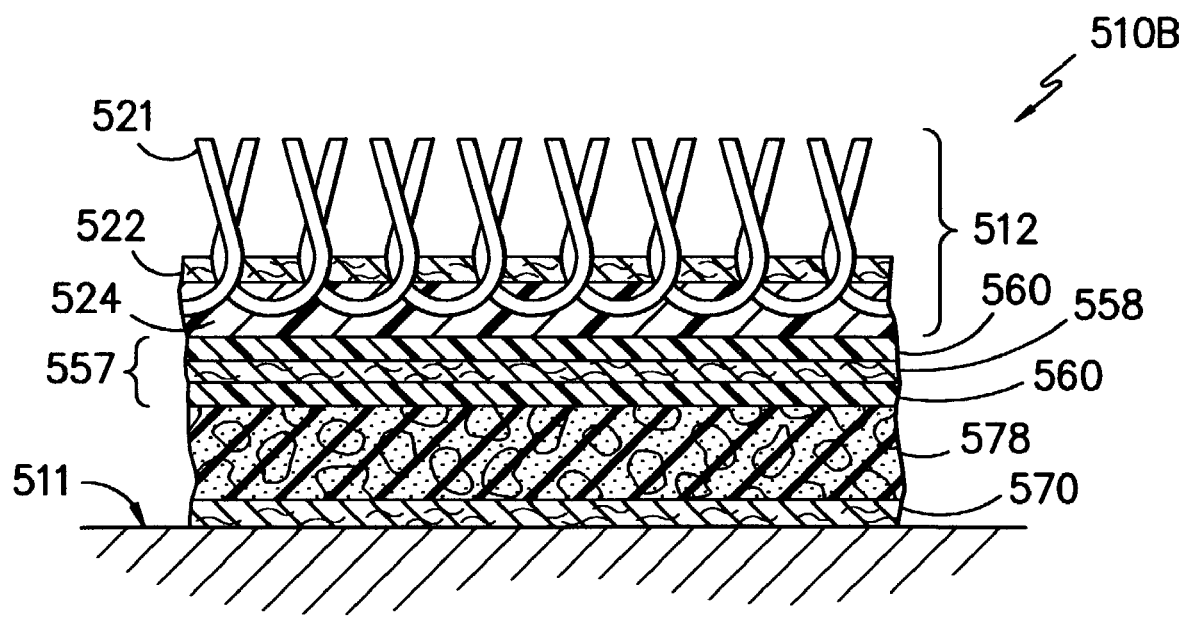
FIG. -15B-

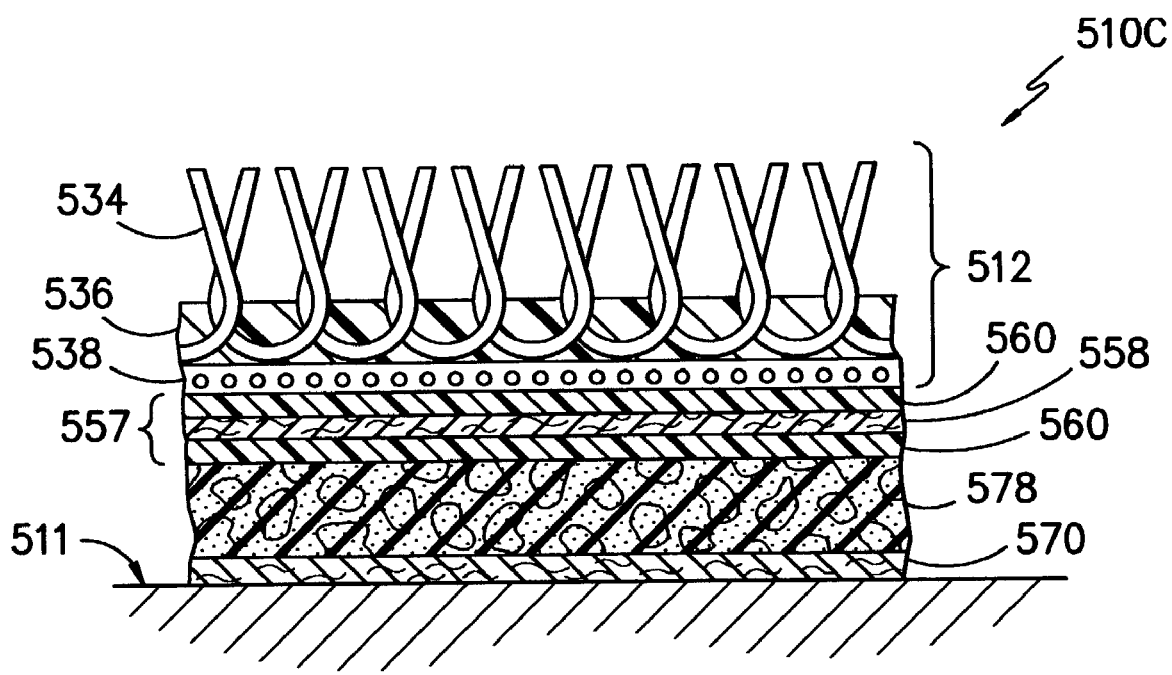
FIG. -15C-
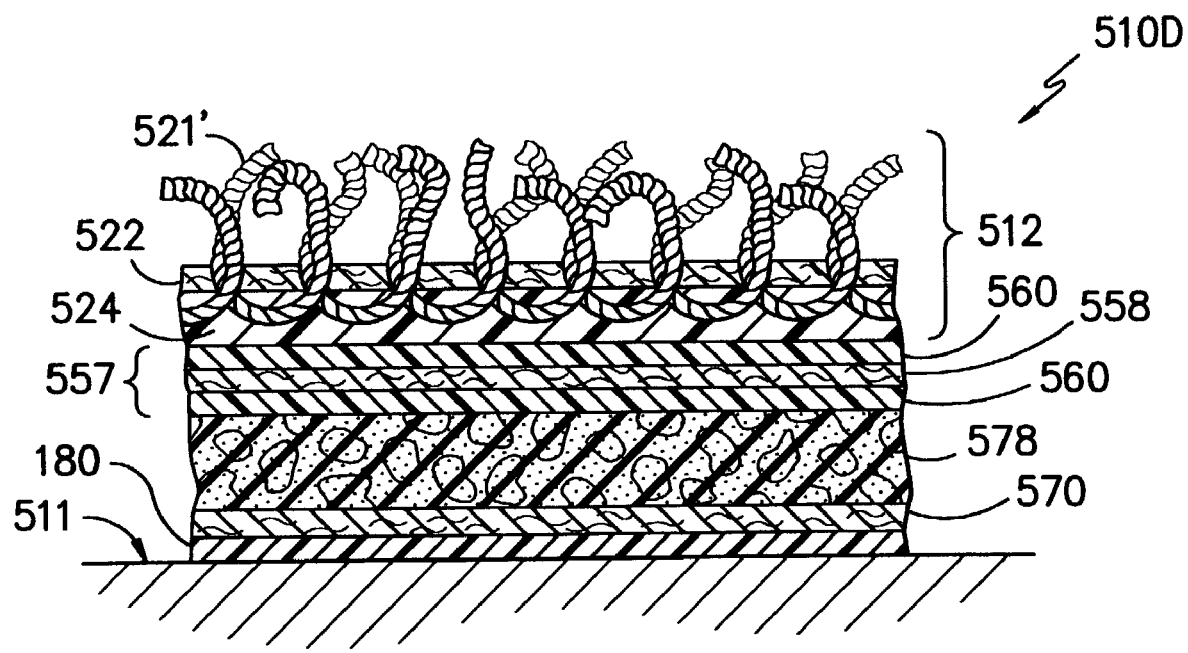
FIG. -15D-

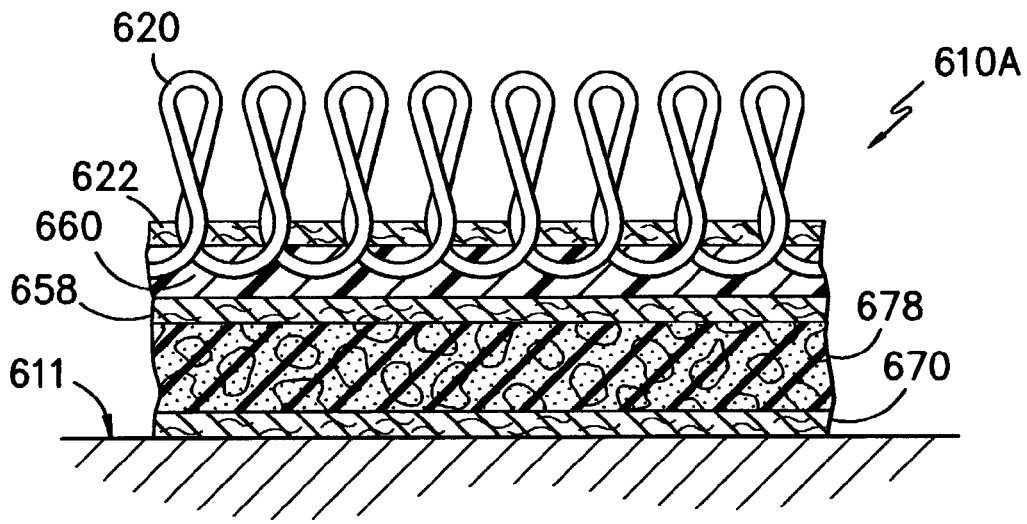
FIG. -16A-
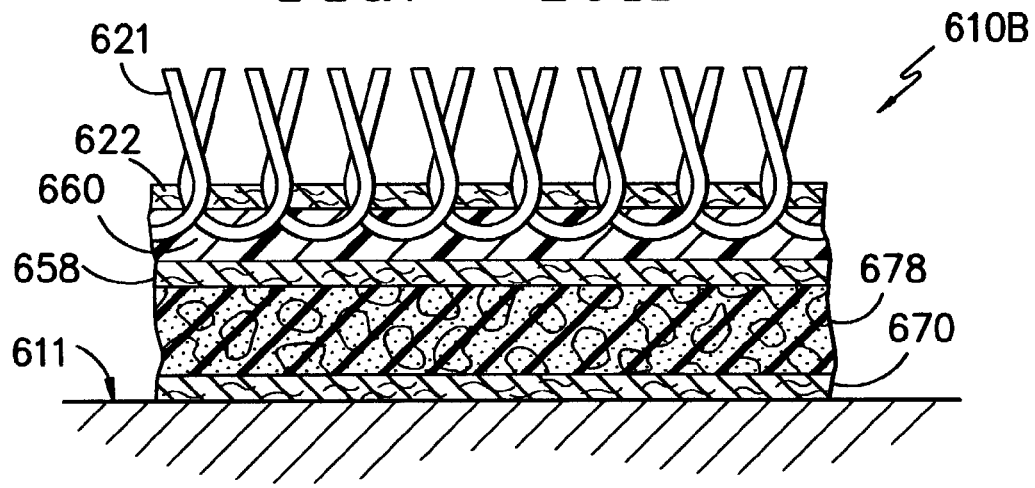
FIG. -16B-
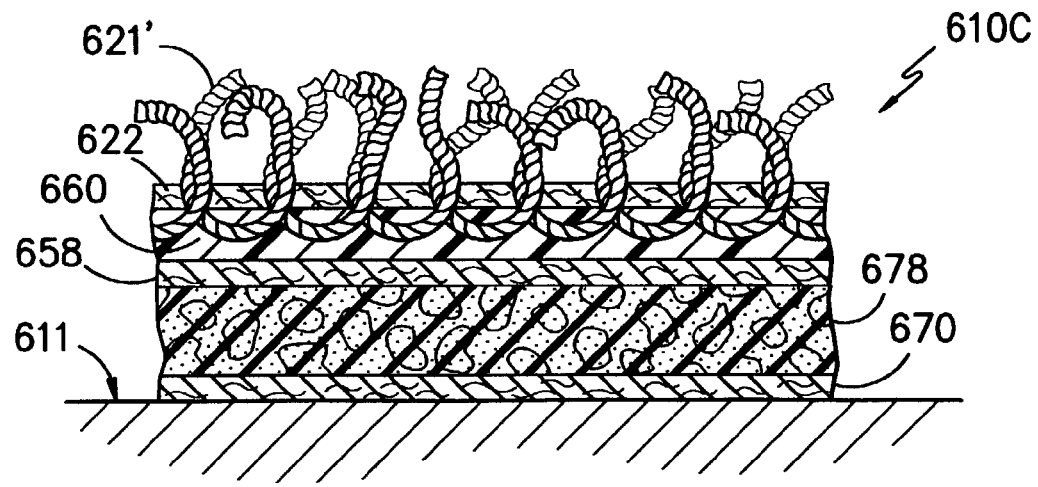
FIG. -16C-

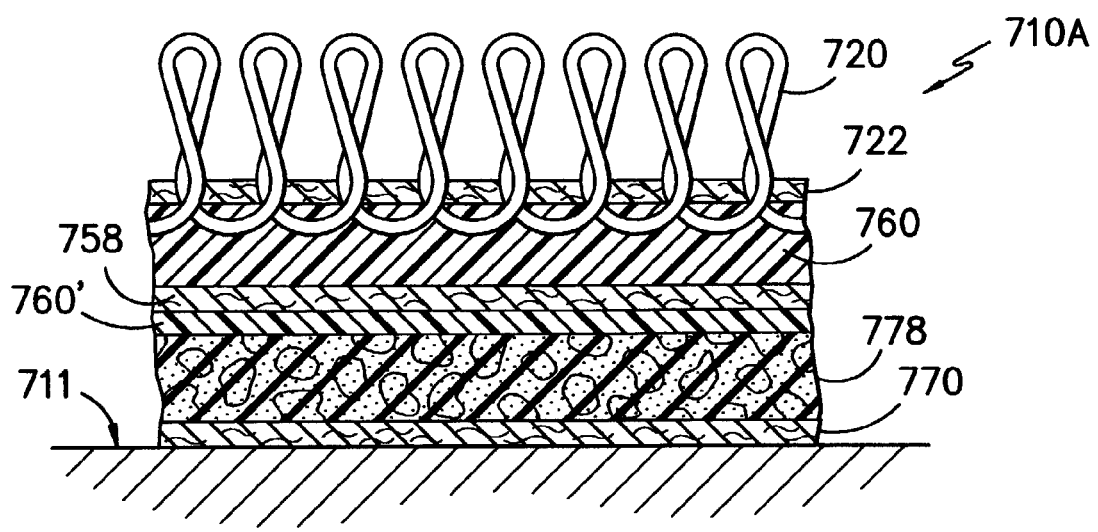
FIG. -17A-
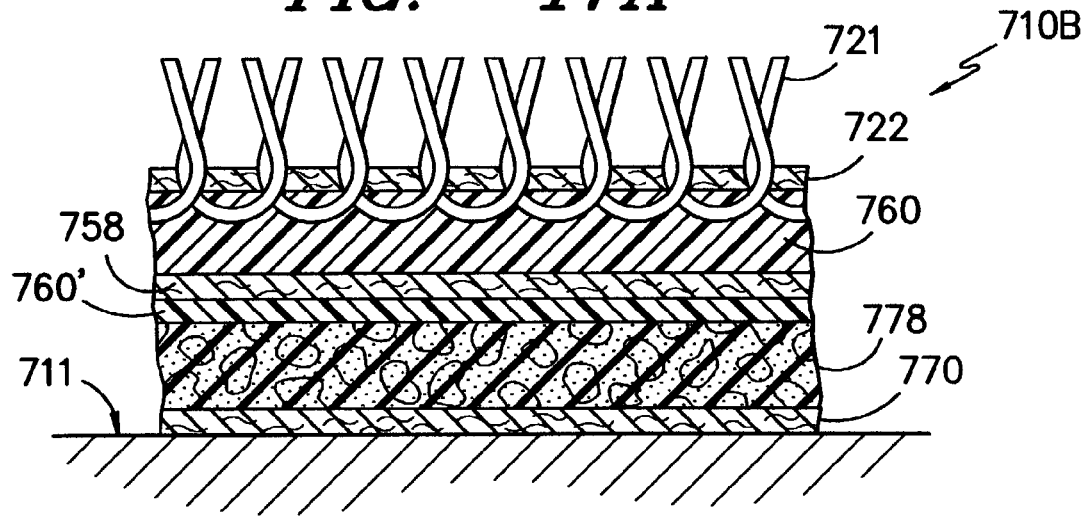
FIG. -17B-
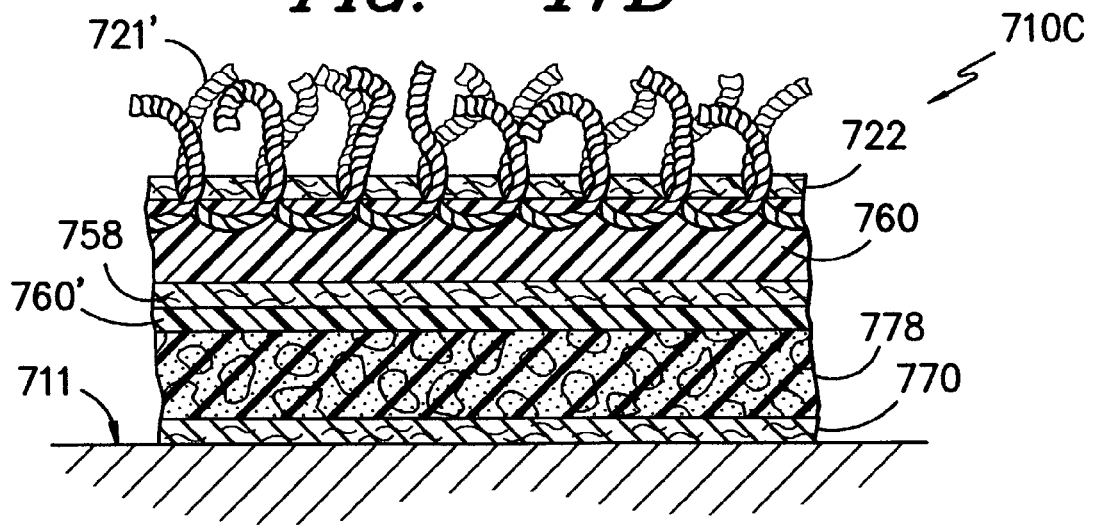
FIG. -17C-

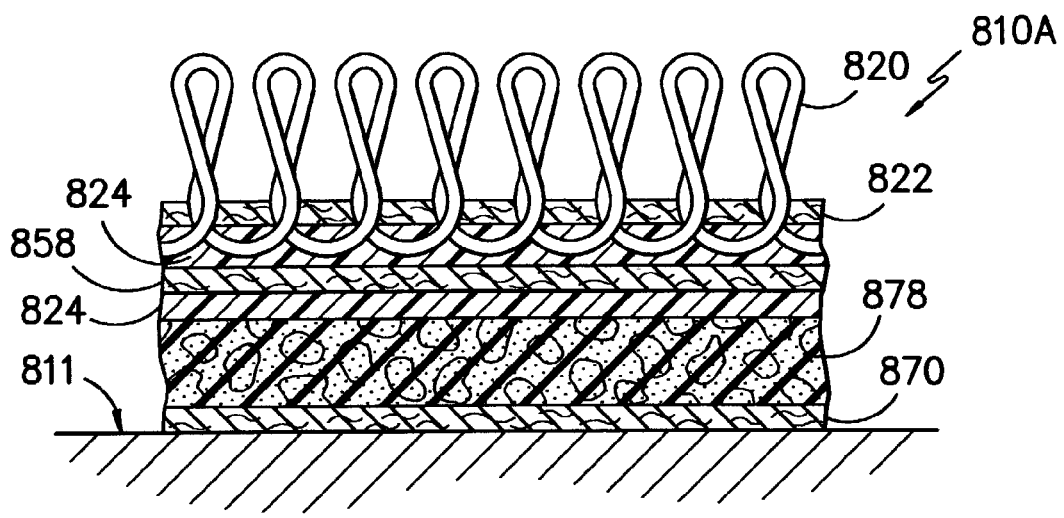
FIG. -18A-
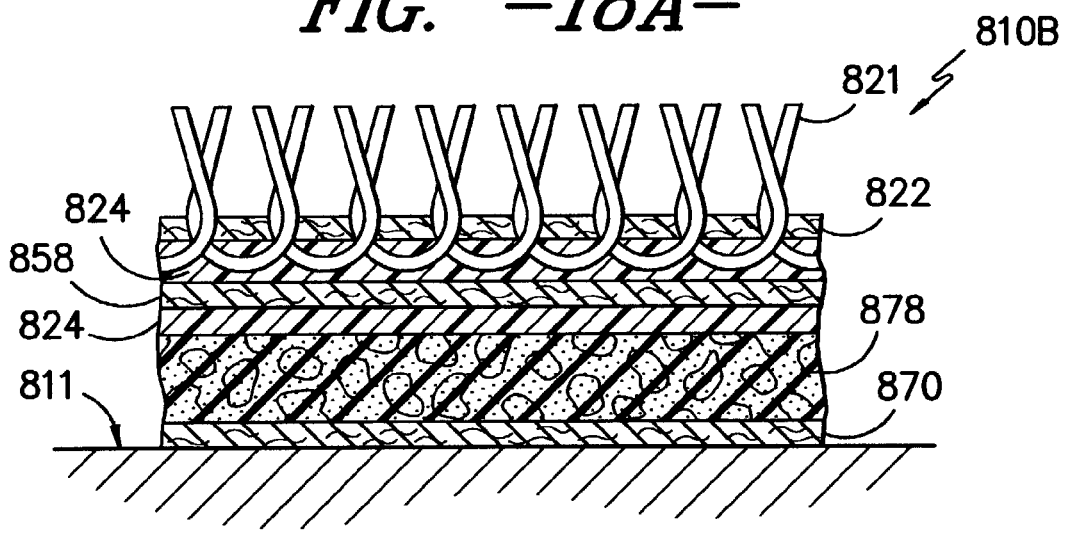
FIG. -18B-
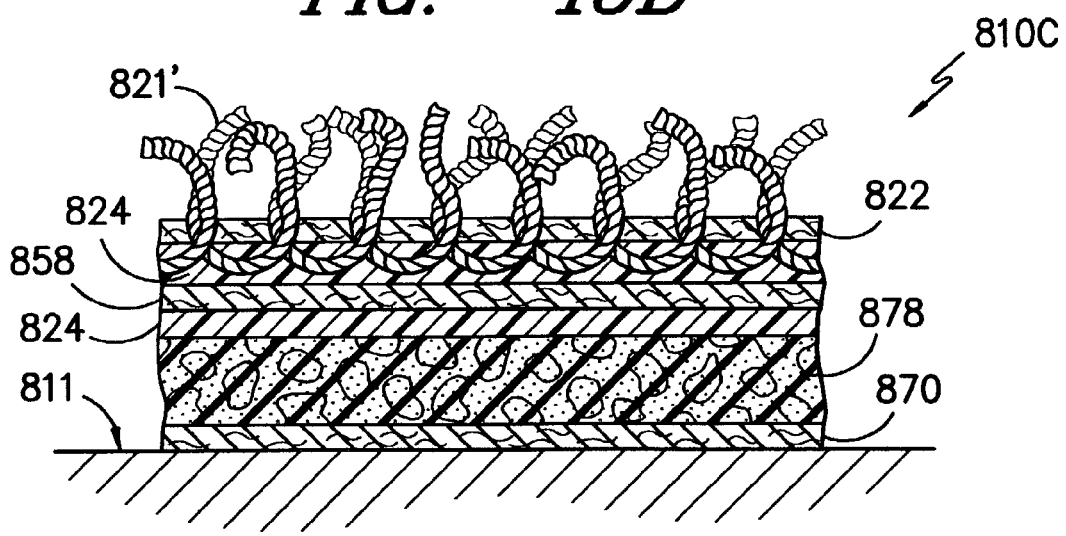
FIG. -18C-

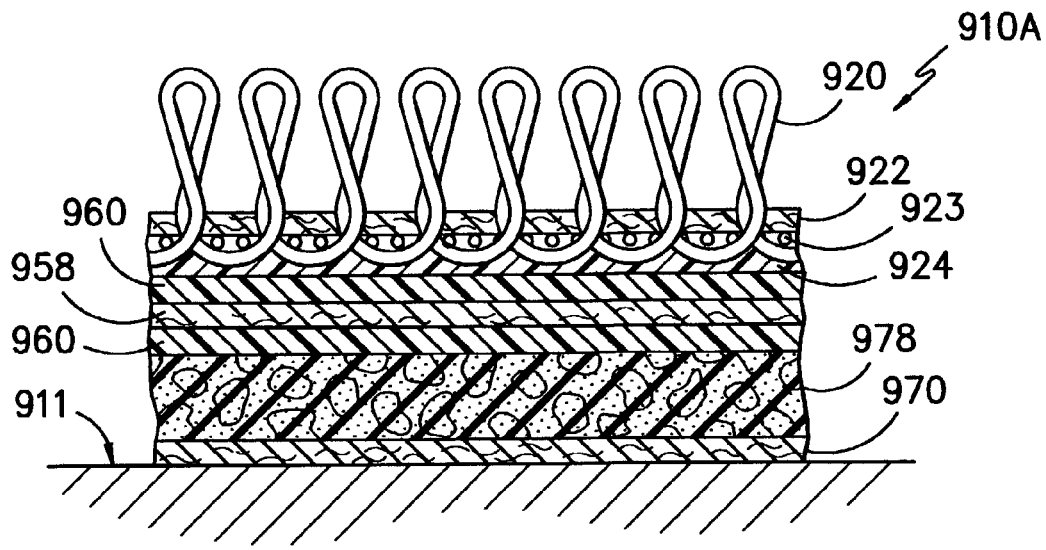
FIG. -19A-
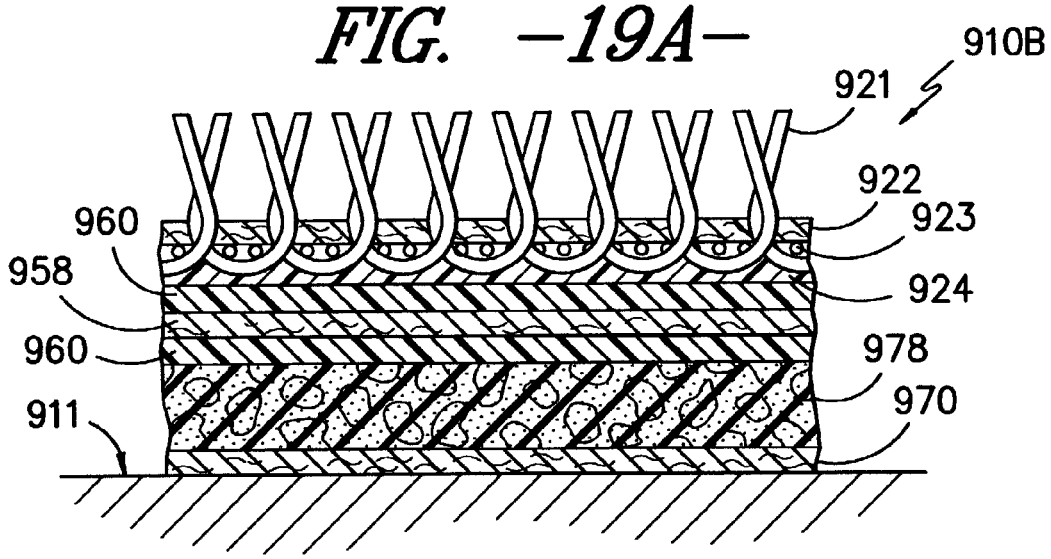
FIG. -19B-
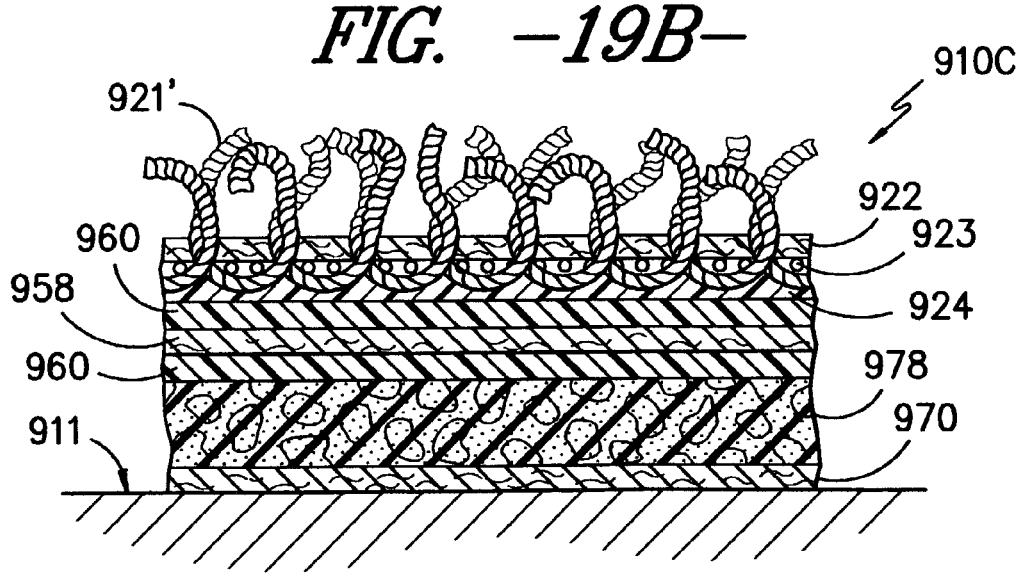
FIG. -19C-

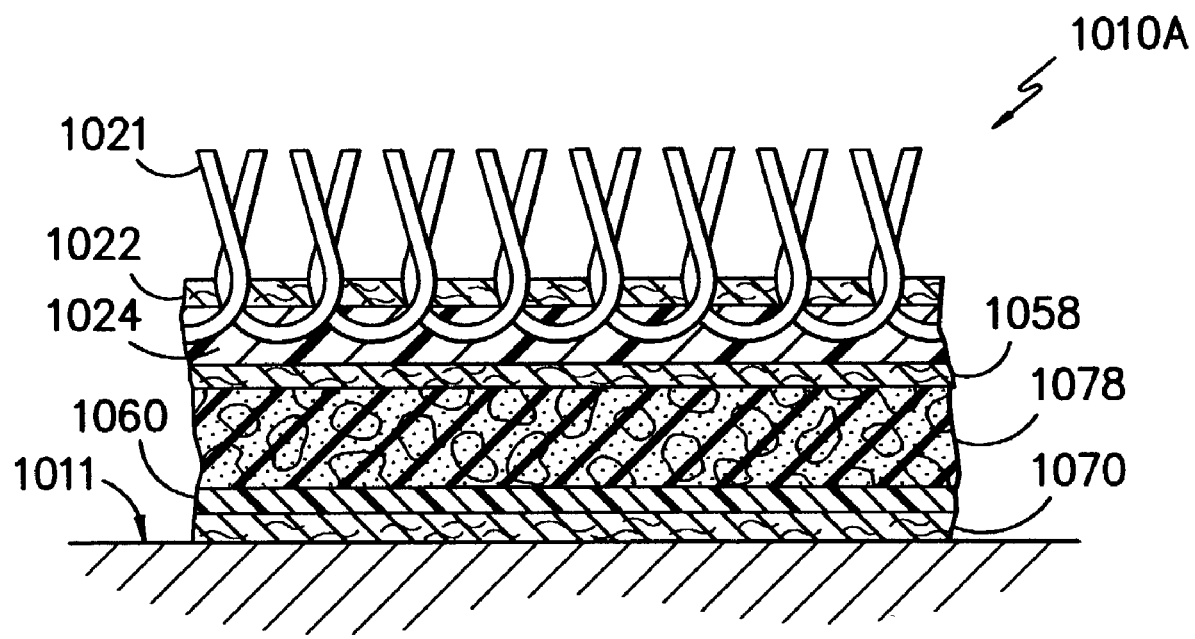
FIG. -20A-
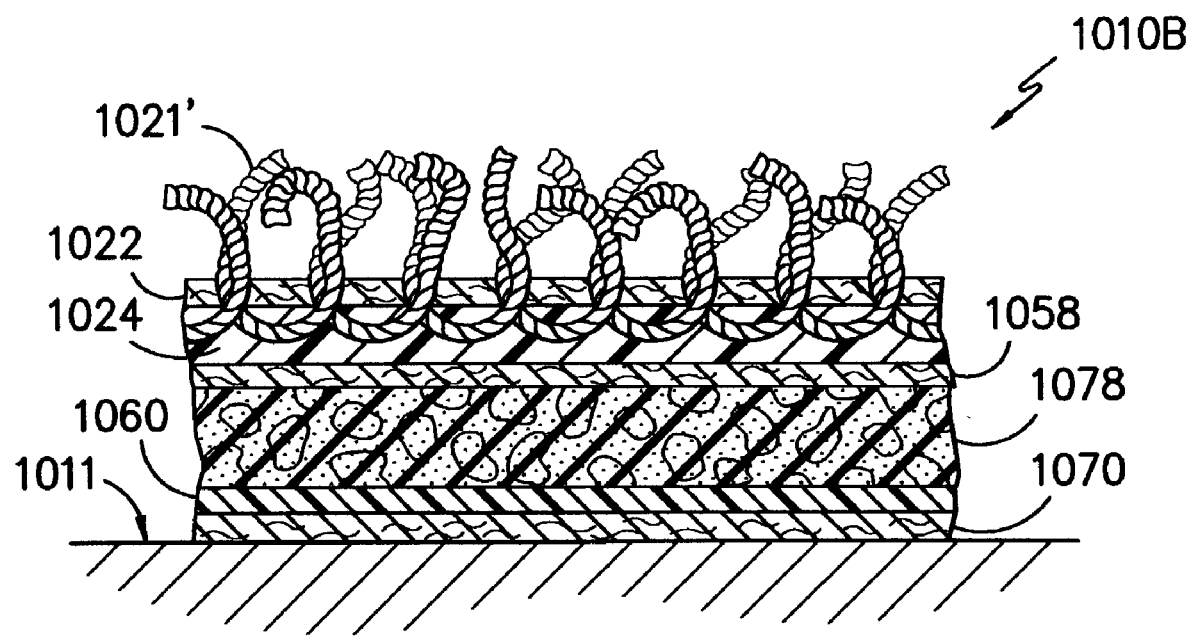
FIG. -20B-

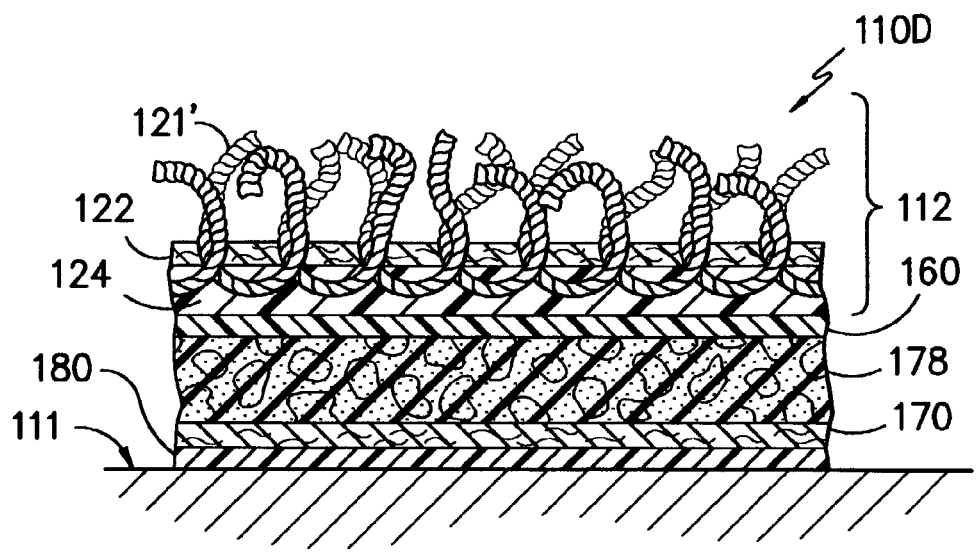
FIG. -21-
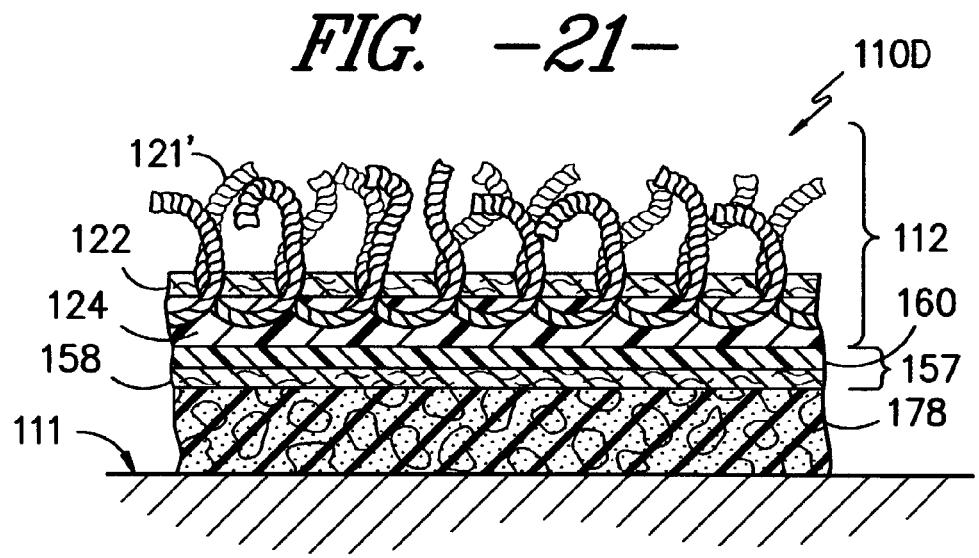
FIG. -22-
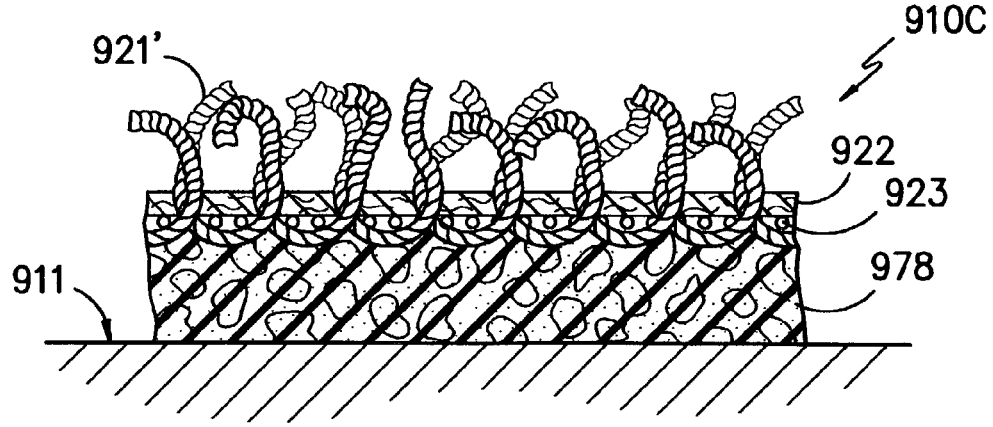
FIG. -23-

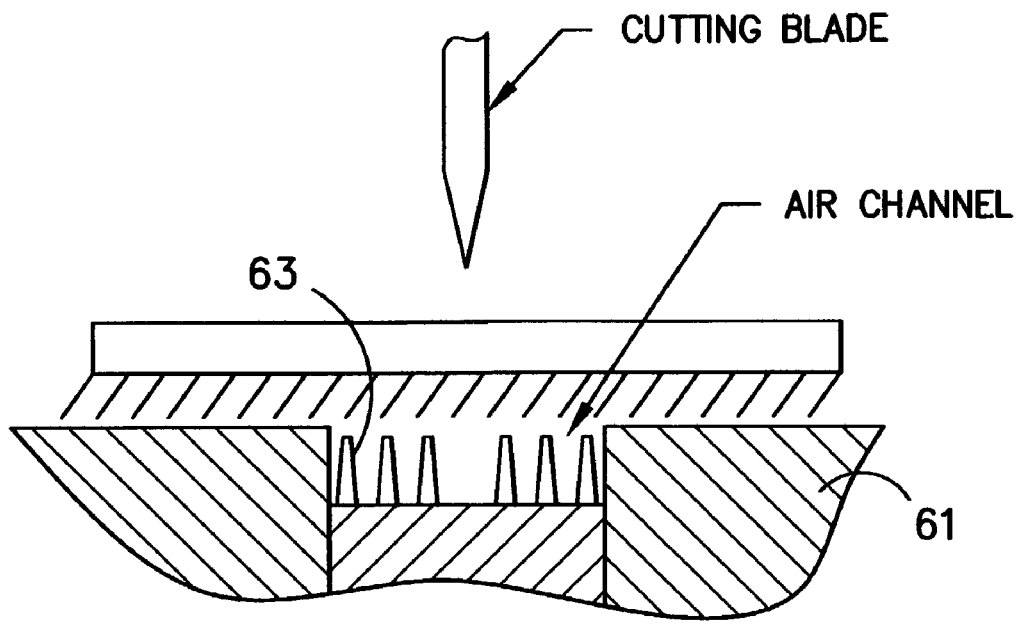
FIG. -24A-
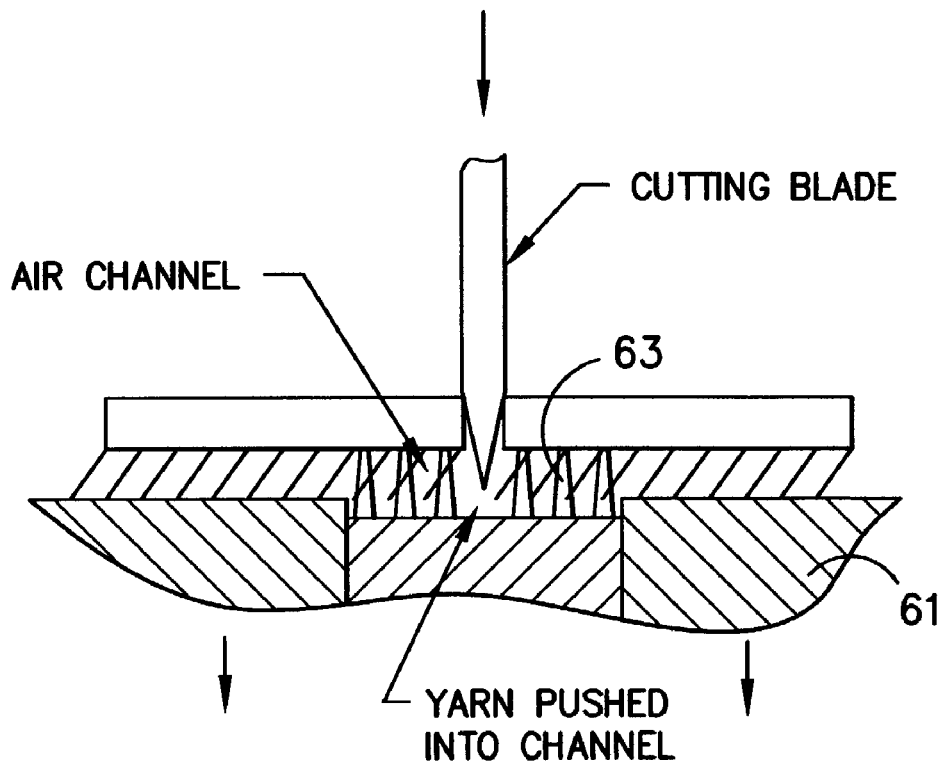
FIG. -24B-

FIG. —25—
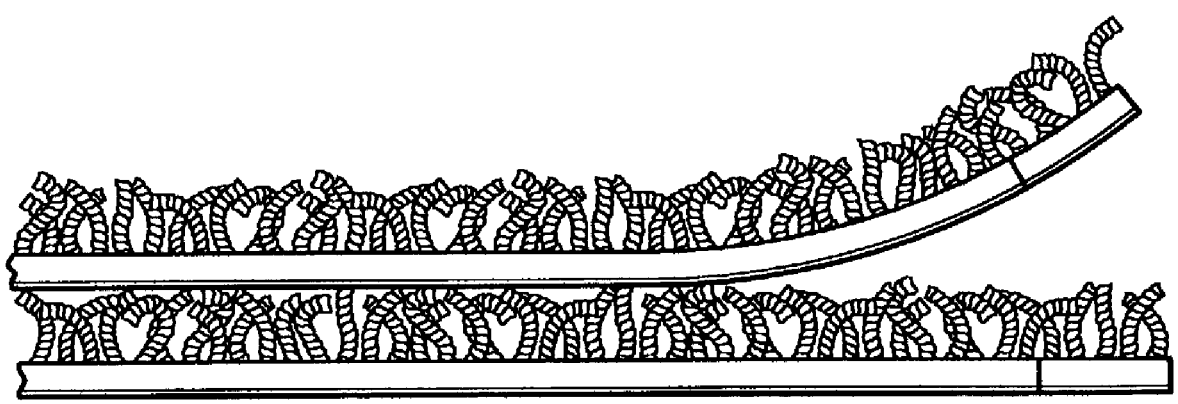
FIG. —26—

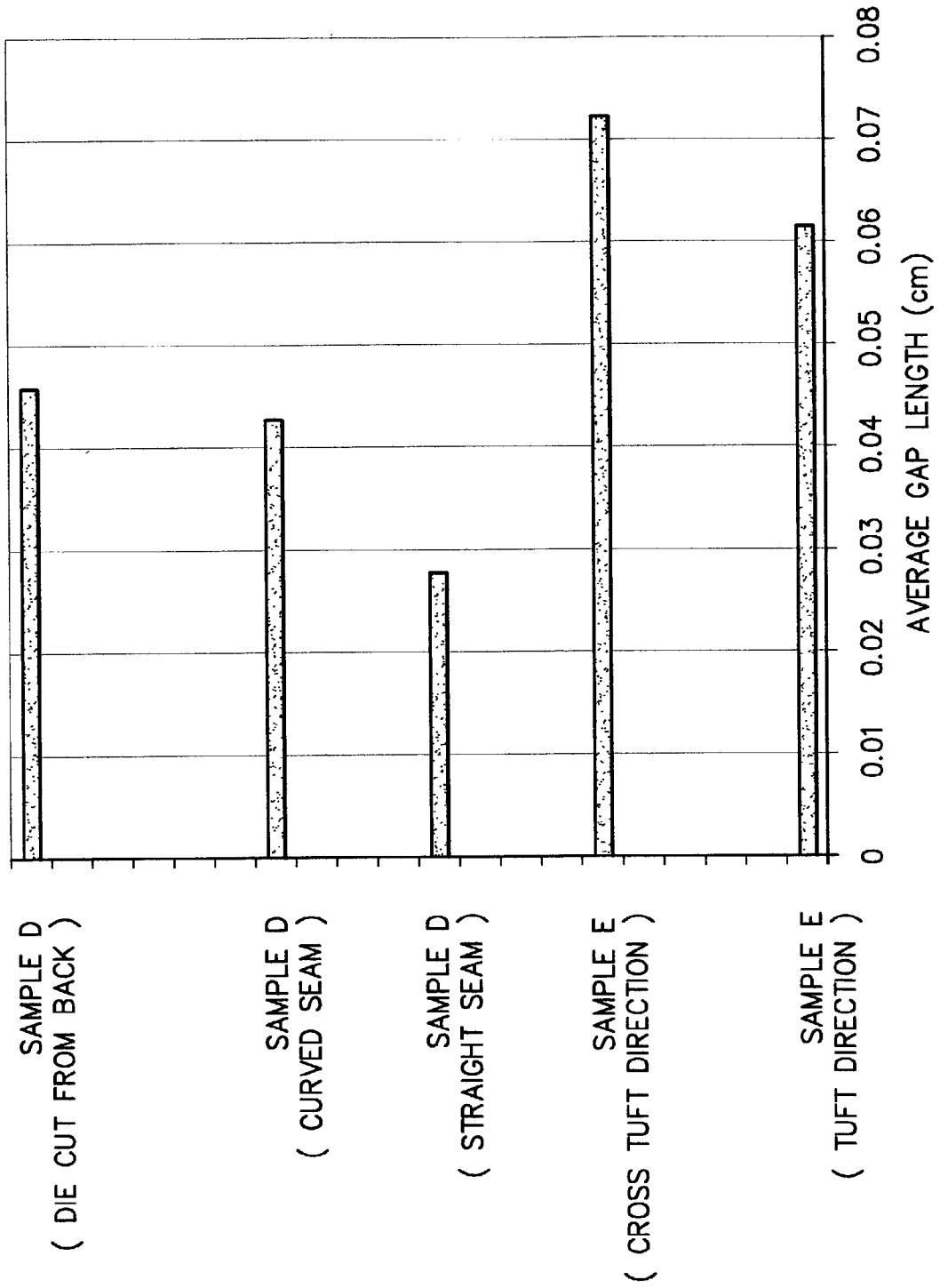
FIG. -27-

FLOORING SYSTEM AND METHOD

FIELD OF THE INVENTION

The present invention relates to flooring systems and more particularly to flooring systems incorporating a multiplicity of replaceable modular surface covering elements adapted for installation in a coordinated arrangement across a supporting subfloor. Constructions of modular surface coverings and methods of formation and installation are also provided.

BACKGROUND OF THE INVENTION

Cushion back carpet products or carpet tiles are described for example in U.S. Pat. Nos. 4,522,857 and 6,203,881 each hereby incorporated by reference herein.

The evolution of flooring in the commercial and residential markets has progressed in two distinct directions based substantially on the requirements of the end user. One aspect of the evolution of commercial floor coverings has been directed to modular floor coverings. The commercial market is exemplified by high traffic, both foot traffic and rolling equipment, and minimal demand for plush, high, pile. A particular problem with commercial applications is the formation of traffic lanes which cause a carpet to show wear in certain lanes of traffic with minimal wear in other areas. To avoid this visually distracting phenomenon, carpet designed for commercial applications has evolved into a material with low mat, minimal or no cushion, and the wide spread use of carpet tiles which can be individually replaced when damaged.

An excellent commercial cushion backed carpet tile or modular cushion back carpet product on the market today, for example, sold under the trademark Comfort Plus® by Milliken & Company of LaGrange, Ga. has a structure similar to, for example FIG. 3A or 3B of U.S. Pat. No. 6,203,881 (incorporated by reference herein), and has a commercial primary carpet fabric with a face weight of about 20 to 40 oz/yd$^2$, a hot melt layer of about 38 to 54 oz/yd$^2$, a prime filled polyurethane foam cushion of about 0.10 to 0.2 inches thick, a cushion weight of about 28–34 oz/yd$^2$, a cushion density of about 16–18 lbs. per cubic foot, and an overall product height of about 0.4–0.8 inches. This superior commercial cushion back carpet tile provides excellent resilience and under foot comfort, exhibits performance characteristics that rate it for heavy commercial use, and has achieved a notable status throughout the industry as having excellent look, feel, wear, comfort, and cushion characteristics, performance, properties, and the like. Such cushion backed carpet tile is relatively expensive to produce due to the high quality and quantity of materials utilized.

Floor coverings in the form of broadloom carpet for residential use have demands which make a commercial carpet undesirable and these divergent requirements have encouraged a divergence in the technology for each market. The most critical parameters for a viable residential carpet is related to the way a carpet feels and looks. This need has only been met previously with a secondary cushion, or pad, and a deep pile broadloom carpet. Residential carpet is almost exclusively broadloom or wall-to-wall carpet.

While broadloom carpet meets the aesthetic and comfort requirements for residential use, there are deficiencies which have not been met in the art. The installation of broadloom carpet requires several steps including: a) installation of tack strips around the border of the area to be carpeted; b) installation of a cushion, or pad, in the area to be carpeted; c) overlaying the broadloom carpet over the pad, without displacing the pad; d) seaming the broadloom carpet pieces together, and e) stretching the carpet and securing it in place by forcing the tack strip through the carpet. This installation requires trained individuals and involves the use of large, bulky, rolls of 12–14 foot wide broadloom carpet and pad. Once a broadloom carpet is soiled or damaged, the entire carpet must be removed for refurbishment or replacement.

Although attempts have been made in the past at marketing certain carpet tile products for use in the home, such as hardback carpet tiles for the kitchen, such attempts have not been successful. Hence, the residential carpet customer has been substantially limited in the choice of home carpet products, for example, to broadloom carpet installed by professional installers over a separate broadloom carpet pad. Many consumers have foregone carpet completely and have opted for linoleum, hardwood or interlocking simulated wood panels, commonly referred to as Pergo, since the choice in carpet does not provide a suitable alternative.

Due to the conflicting demands of carpet for commercial applications and carpet for residential applications advancements in commercial products have not translated directly to suitable products for residential use.

SUMMARY OF THE PRESENT INVENTION

Applicant has discovered that there has been a long standing need and desire for a modular product or carpet tile which has the look and feel of a residential deep pile carpet over pad. The attributes that render a carpet suitable for use in residential are in conflict with those properties which make for a commercial carpet tile. For example, a residential carpet must be sufficiently plush and padded to meet the needs of the residential consumer. Too much cushioning in a commercial carpet tile is detrimental to the performance. For example, when a weight is placed near the edge of a carpet tile, the edge deflects thereby causing a ledge between the carpet tile with the weight and the adjacent carpet tile. The ledge creates many problems. Tiles can slide over one another, often referred to as "snow-plowing". When the edges of adjacent carpet tiles separate in a vertical direction the edge fibers can enter the crevice created by the separation. As the edges attempt to realign, the fibers are trapped in the crevice and appear to be matted. This renders the seam highly visible. In severe cases the separation can be a tripping hazard.

Further, Applicants are unaware of any modular carpeting product which has fully satisfied the needs of adequate cushioning, plush pile, and minimal edge displacement, and is durable with use relevant to a residential installation.

According to one aspect of the present invention, a floor covering system is provided including modular surface covering elements including a pile face suitable for installation and use in a residential application.

According to another aspect of the invention, a method is provided for forming a residential modular carpet and carpet tile having resilience, under foot comfort, the look and feel of broadloom carpet, seamless appearance when installed, which is easy to install, can be installed by the homeowner, and has performance characteristics that rate it for residential or home use.

According to another aspect of the present invention, a flooring system is provided including modular surface covering elements of geometry to facilitate cooperative arrangement of elements across a flooring surface so as to obscure the appearance of seams between elements.

BRIEF DESCRIPTION OF THE DRAWINGS

The accompanying drawings which are incorporated in and which constitute a part of this specification illustrate an exemplary embodiment of the present invention and together with the detailed description set forth below serve to explain the principles of the invention wherein:

FIGS. 1–12 are top view illustrations of geometries and patterning arrangements for surface covering elements across a supporting subfloor;

FIGS. 13A–13D are cut-away side view illustrations of various multi-layered constructions for surface covering elements for disposition across a subfloor;

FIGS. 14A–14B are schematic perspective view illustrations of a production process for multi-layered constructions for surface covering elements for disposition across a subfloor;

FIGS. 15A–23 are cut-away side view illustrations of various multi-layered constructions for surface covering elements for disposition across a subfloor;

FIGS. 24A–24B are schematic side view illustrations of a cutting operation for cutting multi-layered constructions from the back;

FIG. 25 is a side view illustration of a back to back packaging arrangement for surface covering elements having a pile face;

FIG. 26 is a side view illustration of a back to face packaging arrangement for surface covering elements having a pile face such as may occur in a roll; and FIG. 27 is a graph showing average gap length between surface covering elements of various constructions.

DESCRIPTION OF PREFERRED EMBODIMENTS

Exemplary embodiments of the present invention will now be described by reference to the accompanying drawings, in which, to the extent possible, like reference numerals are used to designate like components in the various views. In FIG. 1, an exemplary flooring system is shown schematically in which a multiplicity of modular surface covering elements 10 such as carpet tiles or the like are arranged in edge to edge relation across a supporting subfloor 11. As will be appreciated, the subfloor 11 may comprise any surface suitable to provide support beneath the surface covering elements 10. By way of example only, materials forming the subfloor 11 may include raised access flooring, plywood, wood particle board, hardwood, concrete, tile, ceramic tile, vinyl or laminate, used carpeting or the like.

Regardless of the subfloor being covered, it is contemplated that the surface covering elements will preferably provide an aesthetically pleasing coordinated covering in which the juncture between the individual surface covering elements is not substantially discernible to an observer viewing the final installation. That is, individual seams between the surface covering elements are preferably hidden. Moreover, it is desired that the individual surface covering elements should be readily removeable after initial placement across the subfloor so as to permit repositioning and/or subsequent replacement as desired. In addition, the surface covering elements preferably should have sufficient internal dimensional stability such that once they are placed across the subfloor they maintain their initial geometry and relative position such that seams do not open up over time. Finally, it is desired that the individual surface covering elements should impart a degree of cushioning across the surface of the subfloor being covered. Such cushioning may be particularly desirable for installations in residential environments where comfort may be at a premium.

It is believed that the ability to hide seams may be enhanced by incorporating a three dimensional face covering of defined character across the side of the surface covering elements facing away from the subfloor. The geometry of the surface covering elements and the arrangement of the surface covering elements relative to one another across the subfloor may also influence the ability to hide seams. By way of example only, FIGS. 2-12 provide schematic representations of at least partial installations of different shaped surface covering elements. In particular, FIG. 2 illustrates an arrangement of substantially square surface covering elements 10 arranged in offset relation. It is believed that the use of such offset placement may in some instances tend to break up the perceived continuity of the seams between the surface covering elements. As will be appreciated, the surface covering elements need not be square. Thus, in FIG. 3, there is illustrated an arrangement of substantially elongate surface covering elements 10A of generally rectangular configuration. By way of example only, it is contemplated that such an arrangement may be particularly useful in the event that the surface covering elements are supplied in a roll form or large sheets to be laid down across a subfloor.

Aside from straight sided quadrilateral geometries, it is also contemplated that any number of other geometries including multisided polygonal geometries may also be used. It is believed that the abutting relation of angled edges may provide a dual benefit of facilitating proper installation across the subfloor while also tending to break up the perceived continuity of the seams between the surface covering elements.

FIGS. 4 and 5 illustrate arrangements of one exemplary geometry for a surface covering element 10B having a double chevron on each of two opposing sides (preferably the upper and lower edges) and with the remaining two opposing sides being straight and parallel. As shown, such surface covering elements may be installed in either substantially aligned or staggered relation across a subfloor. The double chevrons on opposite sides of the tile are preferably complements of one another (fit with an adjacent or abutting tile) in that on one side the chevrons are external chevrons which protrude outwardly in a generally convex orientation while on the other side the chevrons are internal chevrons which are recessed in a generally concave orientation.

While the surface covering elements may be of virtually any size as may be desired, in order to reduce the number of elements required to cover a subfloor surface it may be desirable to use surface covering elements of relatively large dimensions. However, these dimensions should be balanced with the need of a user to physically place the surface covering elements across the subfloor during installation. By way of example only, and not limitation, according to one contemplated construction the surface covering elements having a geometry as shown in FIGS. 4 and 5 have straight lateral sides of about 17 inches, each chevron has a width at its base of about 9 inches (one-half the tile width) and a depth (measured normal to the apex) of about one inch. Hence, the resultant surface covering element has nominal outer dimensions of about 18"×18" which is believed to be of a size which can be handled manually. One can make a rectangular tile by either lengthening the straight sides or by widening the chevrons or adding additional chevrons. By way of example only, one contemplated surface covering element having a substantially rectangular nominal outer dimensions has straight sides of about 22 inches, each chevron has a width of about 11½ inches, and a depth of about 1 inch. Thus, the nominal outer dimensions are 23 inches×23 inches.

Of course, it is to be appreciated that any number of other geometric configurations may also be used in formation of the surface covering elements. By way of example only and not limitation, FIG. 6 illustrates rectangular surface covering elements 10C with a single chevron on two opposing sides or ends. FIG. 7 shows rectangular surface covering elements 10D with multiple (triple) chevrons on two opposing sides or ends. FIG. 8 shows surface covering elements 10E with a single chevron on four sides thereof. Note that the opposing chevrons are preferably respective external and internal chevrons. FIG. 9 shows an arrangement of surface covering elements 10F having a single lobe or curved element on four sides thereof. FIG. 10 illustrates a plurality of triangular shaped surface covering elements 10G arranged in an offset pattern. FIG. 11 illustrates a plurality of diamond shaped surface covering elements 10H arranged in an offset pattern. FIG. 12 illustrates a plurality of hexagonal surface covering elements 10I.

As illustrated, according to a potentially preferred practice, each of the modular surface covering elements is preferably substantially identical in configuration to other surface covering elements disposed across the subfloor. Such uniformity of geometry is believed to substantially reduce the complexity of installation which may be useful to users without substantial experience in the installation of flooring systems.

As previously indicated, the ability to hide the seams between the individual surface covering elements may be enhanced by incorporating a substantially three dimensional face covering of defined character across the side of the surface covering element facing away from the subfloor. In particular, it has been found that the disposition of a three dimensional pile construction having tufts of adequate height and population density across the surface covering element may be useful in obscuring the seams between adjacent surface covering elements even if no pattern coloration is utilized. As will be described further hereinafter, such a three dimensional pile construction may also provide a cushioning effect which may be desired by users in a residential environment.

According to one contemplated practice, the surface covering elements disposed across the subfloor are multi-layer composite carpet tile structures including a plurality of yarns defining an outer face projecting away from the subfloor. The yarns are tufted or bonded in place relative to a dimensionally stable backing structure. The yarns are present at a height and population density to provide cushioning and seam hiding characteristics. The backing structure distributes loads applied across the surface covering element and provides dimensional stability to the structure covering element such that shape is maintained over time. If desired, the supporting backing structure may include one or more layers of a cushioning material such as foam or the like to further enhance comfort during use.

Referring to FIGS. 13A, 13B, 13C, 13D exemplary potentially preferred constructions of multi-layer surface covering elements for use in overlaying relation to a subfloor 111 are provided. As illustrated, constructions 110A, 110B, 110C 110D as may be used in surface covering elements of any of the previously described geometries each incorporate a layered arrangement of a pile forming primary pile fabric 112 in overlying relation to a load distributing layer 157 which in turn is disposed in overlying relation to a layer of cushioning material 178, such as virgin foam, or rebonded foam or compressed particle foam which may include an optional backing layer 170. If desired, the backing layer 170 may also include a friction enhancing coating or chemical treatment 180 (FIG. 13D) as will be described further hereinafter.

The load distributing layer 157 may include a sheet of reinforcement material 158 such as glass or the like in combination with a tie coat material 160 such as a thermoplastic adhesive or thermoset adhesive, preferably a hot melt adhesive or the like to establish a bonding relationship between the primary pile fabric 112 and the cushioning material 178. It is also contemplated that the load distributing layer may be substanially free of any reinforcement material if desired. That is, the load distribution layer 157 may be formed substantially entirely of one or more layers of the coat material 160.

It is contemplated that the primary pile fabric 112 may incorporate either a tufted or a bonded configuration (with loop and/or cut pile) as will be well known. It is also contemplated that the primary pile fabric 112 may take on any number of other pile forming constructions including by way of example only and not limitation, textured fabrics having woven, knit, or non-woven constructions.

According to a potentially preferred practice, the primary pile fabric 112 includes a plurality of pile-forming yarns projecting outwardly from one side of a primary base. If the primary pile fabric 112 used in the present invention is a tufted construction as illustrated in FIGS. 13A, 13B and 13C, the primary base is preferably made up of a primary backing 122 and an adhesive pre-coat 124 such as latex or the like. As will be appreciated, the constructions illustrated in FIGS. 13A and 13B are identical except that the pile forming yarns 121 of the embodiment shown in FIG. 13B have undergone a tip shearing or loop cutting operation to yield a cut pile construction. The construction illustrated in FIG. 13D is, in turn, substantially identical to that of FIG. 13B but incorporating pile yarns 121' of a high twist construction such as a frieze construction or the like which imparts substantial kink to the yarns. As will be described further hereinafter, such yarn constructions may be particularly desirable in residential applications where a deep cushioning feel is desired.

In the illustrated bonded surface construction 110C of the present invention (FIG. 13C), the primary pile fabric 112 preferably includes a plurality of cut pile yarns 134 implanted in an adhesive 136 such as a latex or hot melt adhesive which is laminated to a reinforcement or substrate layer 138 of a woven or non-woven material including fiberglass, nylon, polyester or polypropylene. It is contemplated that this substrate layer 138 may be pre-coated with latex or other thermoplastic or thermoset materials or polymers to permit melting adhesion with the cut pile yarns 134 upon the application of heat, thereby enhancing yarn stability.

Although certain embodiments may be preferred, it is to be understood that the primary pile fabric 112 may have different embodiments, and the component structure of the primary carpet fabric 112 is not limited. Rather it is intended that any suitable primary pile fabric having a pile forming portion and a primary base or backing may be utilized as the primary pile fabric. By "primary base" is meant any single layer or composite structure including, inter alia, the commonly used layered composite of primary backing 122 and latex pre-coat 124 typically used in tufted carpet constructions and the adhesive layer 136 with reinforcement substrate 138 typically used in bonded constructions. Other embodiments as may occur to those of skill in the art may, of course, also be utilized. For example, in the bonded product, the pile forming yarns can be heat tacked to the substrate 138 as described in U.S. Pat. No. 5,443,881 (hereby incorporated by reference herein) to permit simplified construction of a primary carpet. Alternative embodiments including those disclosed in U.S. Pat. No. 4,576,665 to Machell (incorporated by reference) may likewise be utilized.

In accordance with a potentially preferred practice, the pile yarn 120, 121, 121' or 134 of constructions 110A, 110B, 110C and 110D, respectively, is capable of being dyed or printed, such as jet dyed, flood dyed, rotary printed, or the like, by, for example, using a Millitron® jet dye machine marketed by Milliken & Company of LaGrange, Ga. Also, it is preferred that the complete construction 110A, 110B, 110C, 110D of FIGS. 13A–13D are capable of being jet dyed, rotary printed, or the like. For example, the exemplary construction used to form the surface covering elements are preferably capable of withstanding the rigors of a jet dye process including dyeing, steaming, washing, drying, and the like. Consequently, the surface covering elements can withstand heat and humidity changes, and the yarn can be dyed or printed. For example, the yarn may be white, light colored, such as off white or light beige, yarn dyed, solution dyed, or the like.

In accordance with at least one embodiment, it is preferred to add an anti-bacterial, anti-fungal or anti-microbial agent, such as ALPHASAN™ marketed by Milliken & Company of Spartanburg, S.C., to at least the latex pre-coat layer if not to the latex pre-coat layer and/or to the face yarn, primary backing, tie-coat layer, reinforcement material, foam or cushion, backing, and/or friction enhancing coating or grip layer. ALPHASAN™ is a silver based anti-microbial agent which can withstand heat during processing.

The yarns 120, 121, 121' and 134 may be either spun or filament yarns and are preferably formed from a polyamide polymer such as nylon 6 staple, nylon 6 filament, nylon 6,6 staple, or nylon 6,6 filament, available from commercial sources such as DuPont in Wilmington, Del. and Solutia Fibers of St. Louis, Mo. However, other suitable natural or synthetic yarns or blends may likewise be employed as will be recognized by those of skill in the art. By way of example only and not limitation, other materials, which might be used, include polyester staple or filament, polyethylene terephthalate (PET), and polybutylene terephthalate (PBT), polyolefins, such as polyethylene and polypropylene staple or filament, rayon, polyvinyl polymers such as polyacrylonitrile, wool, and blends thereof. A variety of deniers, plies, twist levels, air entanglement, and heatset characteristics can be used to construct the yarn.

Although it may be preferred that the yarn (or fiber) be a white or light color to facilitate injection dyeing or printing thereof, it is to be understood that the yarn may be of any nature and color such as solution dyed, naturally colored, and the like, and be adapted for dye injection printing, screen printing, transfer printing, graphics tufting, weaving, knitting, and/or the like.

According to one embodiment, the weight of the yarn within the primary pile fabric will be about 10 ounces per square yard to about 75 ounces per square yard and will more preferably be about 20 ounces per square yard to about 60 ounces per square yard and will most preferably be about 38–39 ounces per square yard.

In accordance with a potentially preferred construction illustrated in FIG. 13D, the primary pile fabric has a face construction such as a frieze cut pile, a saxony cut pile, a loop pile, a Berber loop pile, or the like. A frieze cut pile construction may be potentially preferred. Such constructions provide bulk through the pile due to the fact that the terminal ends of the individual pile yarns are kinked such that the extended length of the yarns actually exceeds the pile height. This bulking gives rise to enhanced compressibility in the thickness dimension of the surface covering element. Such enhanced compressibility is believed to correlate to a generally cushioned feel by a user.

Exemplary and potentially preferred construction features for a pile fabric of tufted construction for use in a surface covering element according to the present invention are provided in the following table.

| Primary Pile Fabric Construction | | |
|---|---|---|
| Pile Parameter | Range | Preferred |
| Yarn Denier | 900–3000 | 1180 |
| Yarn Ply | 1–4 | 2 |
| Yarn Twist | 2–9 | 7.5 |
| Yarn Stitch Rate | 6–12/inch | 7.7/inch |
| Gauge | 3/16–5/64 | 1/8 |
| Face Weight | 10–75 oz/yd$^2$ | 38 oz/yd$^2$ |
| Pile Height Measured From Above Primary Backing | 0.3"–1.5" | 0.75" |

As will be appreciated, the desired depth and population density of pile forming yarns across a surface covering element may differ depending upon the intended environment of use. In particular, it is believed that a deeper less populous pile construction may be desired if the surface covering elements are to be used in covering relation to a floor in a residential environment such as a user's home. Conversely, shorter pile which is packed closer together may be desired if the surface covering elements are to be used in a commercial environment such as an office, a hospitality environment such as a hotel or an institutional environment such as schools or hospitals.

By way of example only, one potentially preferred cut pile primary pile fabric with a frieze twist formed according to the parameters set forth in the above table for use in surface covering elements for residential applications is characterized by a normal resultant pile depth of about 0.418 inches above the primary backing with a pile length above the primary backing (measured by pulling the yarn to its full extended length) of about 0.6 inches. The mass per unit area of yarn above the primary backing (or other primary base) measured by shaving the yarn across the primary backing and weighing the resultant product is about 29.08 ounces per square yard. Based upon the measured normal depth of 0.418 inches, the standard pile density is about 2,504.5 ounces per cubic yard.

The term "standard pile density" is to be understood to be the ratio of the mass of yarn shaved from the primary backing over a unit area divided by the normal pile depth as represented by the following formula:

$$\frac{m}{p}$$

where:

m is the mass in ounces of yarn over the primary backing in one square yard of primary pile fabric; and p is the pile height in yards.

Preferably, surface covering elements for use in covering relation to subfloors in a residential environment will be characterized by a standard pile density in the range of about 500 ounces per cubic yard to about 4,200 ounces per cubic yard. More preferably, surface covering elements for use in covering relation to subfloors in a residential environment will be characterized by a standard pile density in the range of about 1500 ounces per cubic yard to about 3500 ounces per cubic yard. Most preferably, surface covering elements for use in covering relation to subfloors in a residential environment will be characterized by a standard pile density in the range of about 2000 ounces per cubic yard to about 3,000 ounces per cubic yard.

By way of comparison, a standard pile face for use in a high traffic hotel hospitality environment as sold under the trade designation GRAND PLAZA by Milliken & Company is characterized by a standard pile density of about 4,357.3 ounces per cubic yard.

As will be appreciated, a higher pile height may be desired in a residential environment than in a commercial or hospitality environment. For residential applications it is believed that a normal pile height above any primary backing is preferably in the range of about 0.25 inches to about 0.75 inches and more preferably about 0.3 inches to about 0.5 inches and most preferably about 0.4 inches. In this regard, It is to be understood that by the term "normal pile height" is meant the naturally occurring level of yarn over the primary backing. As illustrated in FIG. 13D, this normal pile height may be less than the actual yarn length due to bending as a result of texturing or twist in the yarn.

The primary backing 122 used in the tufted constructions of FIGS. 13A, 13B and 13C may be a traditional woven or nonwoven structure of polyester or polypropylene. However, it is also contemplated that specialized primary backings such as non-woven structures comprising fiberglass sandwiched between layers of polyester may be utilized in the primary backing 122 of the tufted constructions to impart the desired properties relating to stability and cutability thereby potentially reducing or even eliminating the need for adhesive pre-coat 124. Alternative primary backing or tufting substrate embodiments are described, for example, in pending U.S. patent application Ser. No. 10/098,053, filed Mar. 12, 2002 the teachings of which are hereby incorporated in their entirety as if fully set forth herein.

By way of example only and not limitation, according to one contemplated practice, the primary backing 122 is a fused multi-component structure of a woven layer and a non-woven material needle punched through the woven layer, with at least a portion of the non-woven material being a low melt or binder material which when subjected to calendering (pressure and heat) melts and fuses the non-woven and woven materials to form an enhanced stability primary backing. The woven layer is a woven polypropylene, the non-woven material is polyester, and the low melt material is low melt or co-polyester. The weight percent range of low-melt or binder material may range from about 10%–100% by weight of the non-woven, preferably 10%–70%, most preferably 10%–40%. The non-woven material may be any natural or synthetic fiber or blend thereof. For example, the non-woven may be polyester, recycled polyester, polypropylene, stabilized polypropylene, acrylic, nylon (polyamide), bi-component polyester, bi-component nylon, and blends or combinations thereof. If the non-woven material is a polypropylene or stabilized polypropylene, then no additional low melt material may be required. The low melt material may be any synthetic material or fiber or blend that has a melting point below the calendering temperature and will adhere to the adjacent fibers. For example, the binder or low melt material may be polyester, copolyester, polypropylene, polypropylene that has been chemically enhanced to raise the melt temperature, bi-component polyester, bi-component nylon, polyethylene, nylon, low melt nylon web, powder binder, chemical binder, extruded polypropylene web, and combinations or blends thereof. The woven material may be any natural or synthetic material or fiber or blend which serves as a tufting base in combination with the non-woven and low melt materials. For example, the woven material may be polypropylene, stabilized polypropylene, flat ribbon yarn (tape) polypropylene, polyester, polyester knitted scrim, polypropylene woven scrim, recycled polyester, and blends or combinations thereof. In accordance with one exemplary construction, the woven layer or material may have a pick range of from about 6×6 to 30×30, preferably from about 10×10 to 24×22, the non-woven material may have a weight range of about 1–6 oz./sq. yd., with a low melt or binder content of about 10–100% by weight.

In accordance with one exemplary embodiment, an enhanced primary backing 122 having an overall thickness of about 0.017 inches and weight of about 5.03 oz./sq. yd. may be utilized. The primary backing includes a woven, a non-woven material of blended, needled, and fused thereto polyester and low-melt polyester fibers (50% by weight natural polyester fibers 2½ denier, 20% black polyester fibers 4 denier, and 30% low melt polyester 3 denier) is formed by placing the non-woven material over the woven layer, needle punching the non-woven material to the woven layer such that a small amount of the non-woven goes through the woven layer and then calendering the composite on both sides (at a temperature of about 320° F. top roller, 280° F. bottom roller with roller pressures of about 85 pounds force) force to fuse the non-woven material and woven layer. This fused, enhanced stability primary backing is less likely to fray when cut, does not harm the tufting yarn, provides dimensional stability, and better tuft lock.

In tufted constructions, the adhesive pre-coat 124 is preferably styrene butadiene rubber (SBR) or latex but other suitable materials such as styrene acrylate, polyvinyl chloride (PVC), ethylene vinyl acetate (EVA), acrylic, and hot melt adhesives such as bitumen, polyurethane, polyester, polyamide, EVA, or asphalt based hot melt adhesives or blends thereof may likewise be utilized. In the event that a hot melt adhesive is utilized, it is contemplated that a reinforcement material such as a fiberglass, nylon or polyester scrim, woven or non-woven may be directly attached to form a composite laminate without the use of additional adhesive layers. Moreover, it is contemplated that the adhesive pre-coat 124 may be entirely eliminated in the tufted product if the pile yarn is tufted in suitably stable relation to the primary backing 122 thereby yielding a construction as illustrated in FIGS. 16A–16C.

As previously indicated, it is contemplated that a surface covering element construction according to the present invention including either a tufted or a bonded primary pile fabric 112 across the surface facing away from the subfloor 111 preferably includes a load distribution layer 157 at a position below the primary pile fabric. By way of example only, it is contemplated that the load distribution layer 157 may include one or more layers of a resilient polymeric tie coat material 160. The polymeric tie coat material 160 may be of either a thermoplastic or a thermosetting composition. Hot melt adhesives may be particularly preferred. By way of example only and not limitation, useful hot melts may include bitumen and polyolefin-based thermoplastics. Useful thermosetting adhesives may include polyurethanes. In the event that the tie coat material 160 is a hot melt adhesive, it is contemplated that the total mass of hot melt adhesive utilized within the load distribution layer 157 will preferably be in the range of about 20 to about 100 ounces per square yard and will more preferably be present at a level of about 35 to about 90 ounces per square yard.

The composition of one potentially preferred hot melt adhesive is set forth in the following table.

| Hot Melt Composition | |
|---|---|
| Component | Percentage |
| Asphalt | 17.6% |
| Stearic Acid | 0.3% |
| Heat Stabilizer | 0.2% |
| Antioxidant | 0.1% |
| Tackifier | 3.0% |
| Amorphous Polypropylene | 4.0% |
| Acid Modified Polypropylene | 2.0% |
| Calcium Carbonate Filler | Remainder |

The physical properties of the hot melt composition from the above table are set forth below.

| Hot Melt Properties | |
|---|---|
| Softening Point | 314–320° F. |
| Cold Flow | 2 to 5 mils per 4 hours |
| Flex Mandrel | 12 to 16 mm at 76 mils |
| CR Viscosity (at 5 sec$^{-1}$) | 28,000 to 35,000 cps |
| CS Viscosity (at 50 Tau) | 10,000 to 13,000 cps |
| Tensile Strength | ~450 p.s.i. |
| Elongation at Break | 5.8% |

If desired, a reinforcement material 158 may also be disposed within the load distribution layer 157. In some constructions, the reinforcement material may enhance dimensional stability within the surface covering element to substantially prevent the various layers from undergoing disproportionate dimensional change as the surface covering element is subjected to compressive forces and/or temperature or humidity changes during use and/or processing. One contemplated reinforcement material 158 is a sheet, mat or tissue incorporating multiple fiberglass (glass) fibers entangled in a non-woven construction such as a 2 oz/yd$^2$ construction and may be held together by one or more binders such as an acrylic binder or modified acrylic binder. Other materials as may be utilized include woven glass or glass scrim materials as well as woven or non-woven textile materials such as polyester or nylon. If desired, it is also contemplated that the reinforcement material 158 may be eliminated such that the load distribution layer is made up substantially entirely of the tie coat material.

Whether or not a reinforcement material 158 is utilized, the load distribution layer 157 nonetheless acts to disperse concentrated loads laterally through the surface covering element thereby dissipating the applied energy and preventing the structure from being damaged. In operation, the tie coat material 160 acts as a buffer against force concentration and will protect any reinforcement material 158 against puncture or other damage which may arise from point loading. By way of example, the load distribution layer must have sufficient strength and resiliency such that a small diameter shoe heel or other force concentrating object does not puncture the construction.

As indicated, the cushioning material 178 may be a foam material. Potentially preferred foam materials may include virgin or prime polyurethane, rebonded polyurethane and combinations thereof. Rebonded polyurethane may be particularly preferred so as to permit the surface covering elements to incorporate a relatively high percentage of recycled material.

As will be appreciated, rebond foam in general and rebond polyurethane foam in particular is known in the art of isocyanate-based polymeric foams. Specifically, it is known to mix pieces of foam with a binder which serves to bond the pieces to one another. Rebonding technology has been used for a number of years to recycle, inter alia, polyurethane foams. Generally, a large chip or chunk size, low density, non-uniform density, rather frangible, thick, rebonded polyurethane foam product has been used as a separate, relatively thick, underlayment or pad for broadloom carpet placed across a subfloor.

In accordance with the present invention, the cushioning material 178 in the surface covering element preferably incorporates at least about 10–90% recycled foam or rebond foam containing at least about 10–100% recycled foam chips, chunks, pieces, grounds, particles, or the like and a binder, adhesive, or prepolymer (and one or more additives) to produce a construction with an integral cushioning layer having at teast about 10–100% recycled foam or cushion content (especially post industrial reclaimed foam or cushion content) in the foam or cushion layer thereof.

In accordance with the present invention, it is preferred to use a rebond foam with a density of about 1 to 25 lbs per cubic foot, more preferably about 3–22 lbs. per cubic foot, still more preferably 5–13 lbs. per cubic foot, and most preferably 6–10 lbs. per cubic foot; a thickness of about 1–30 mm, more preferably about 2–21 mm, and most preferably about 4–12 mm; a rebond chip size (uncompressed chip size) of about 2–25 mm, more preferably about 5–20 mm, most preferably about 7–15 mm round or square hole mesh; and, a backing material or backing composite on at least one side thereof.

Table 1 below details a first exemplary range of production parameters for rebond foam for use as a cushioning layer in a modular floor covering to be used in a residential environment.

TABLE 1

| | |
|---|---|
| Foam Weight | 7–84 oz/yd$^2$ |
| Foam Density | 4–16 lbs./ft$^3$ |
| Foam Thickness (prelamination) | 2–20 mm |
| Uncompressed Chip Size | 2–20 mm |
| Chip Material | Polyurethane Foam (polyester or polyether) |
| Binder or Prepolymer | 5–20% |
| Chips | 60–95% |
| Binder Material | Polyurethane Prepolymer (polyester or polyether) |
| Compression Ratio | 2:1–5:1 |
| Additives such as colorant, fill, fiber, antimicrobial, flame retardant, etc. | 0–20% |

Table 2 below details a second exemplary range of production parameters for rebond foam for use as a cushioning layer in a modular floor covering to be used in a residential environment.

TABLE 2

| | |
|---|---|
| Foam Weight | 10–28 oz/yd$^2$ |
| Foam Density | 5–10 lbs./ft$^3$ |
| Foam Thickness (prelamination) | 5–12 mm |
| Uncompressed Chip Size | 5–15 mm |
| Chip Material | Polyurethane Foam (polyester or polyether) |
| Binder or Prepolymer | 12–17% |
| Chips | 83–88% |
| Binder Material | Polyurethane Prepolymer (polyester or polyether) |
| Compression Ratio | 3:1 |
| Additives such as colorant, fill, fiber, etc. | 0–5% |

Tables 3–5 set forth target specifications for rebond foam materials which may be used in various modular residential floor covering structures.

TABLE 3

| | |
|---|---|
| Foam Density | 6 lbs./ft$^3$ |
| Foam Thickness (prelamination) | 7–8 mm |
| Uncompressed Chip Size | 15 mm |
| Chip Material | Polyurethane Foam |
| Binder or Prepolymer | 15% by weight |
| Chips | 82–85% by weight |
| Binder Material | Polyurethane Prepolymer |
| Compression Ratio | 3:1 |
| Colorant (may be added) | Milliken Reactint polyurethane colorant at about 3% |

TABLE 4

| | |
|---|---|
| Foam Density | 6.3 lbs./ft$^3$ |
| Foam Thickness (prelamination) | 7 mm |
| Uncompressed Chip Size | 7 mm |
| Chip Material | Polyurethane Foam |
| Binder or Prepolymer | 15% by weight |
| Chips (free of unbonded material) | 82–85% by weight |
| Binder Material (free of binder knots) | Polyurethane Prepolymer |
| Compression Ratio | 3:1 |
| Colorant (may be added) | Milliken Reactint polyurethane colorant at about 3% |

TABLE 5

| | |
|---|---|
| Foam Density | 3 lbs./ft$^3$ |
| Foam Thickness (prelamination) | 6 mm |
| Uncompressed Chip Size | 5 mm |
| Chip Material | Polyurethane Foam |
| Binder or Prepolymer | 15% |
| Chips | 82–85% |
| Binder Material | Polyurethane Prepolymer |
| Compression Ratio | 2:1 |
| Colorant (may be added) | Milliken Reactint polyurethane colorant at about 3% |

As will be appreciated, while rebond foam as described above may be preferred, it is contemplated that the material forming the cushioning layer 178 may be the subject of a broad range of alternatives. By way of example only and not limitation, at least five options or examples of foam for use in forming the cushion material 178 are contemplated for forming the surface covering elements.

1. Use of standard filled Polyurethane system as the virgin and/or rebond polyurethane. One contemplated polyurethane foam contains 110 parts of filler and has a density of about 15 lbs/cu. ft. Based upon a thickness in the range of 0.04–0.12 inches, using the density and filler levels above, the weight range of the polymer is about 4.32 oz/sq yd to 12.96 oz/sq yd. The density can be lowered by lowering the amount of filler.
2. Another option which would also work for the virgin and/or rebond polyurethane is to adjust the filler levels to reduce the density to 13 lbs/cu. ft. At the same thickness limits the polymer weights would then be 2.72–8.24 oz/sq. yd.
3. Another option for the virgin and/or rebond polyurethane is to use an unfilled polyurethane (Prime urethane) system. High densities such as above are not possible with prime however, they perform because of the wall structure and the fact that no filler is present. Based upon a prime at 6 lbs/cu. ft. applied at the thickness limits above the polymer weight would be 2.88–8.64 oz/sq. yd.
4. Another option is to use a polyurethane system available under the trade designation KANGAHIDE by Textile Rubber and Chemical Company which has only 15 parts of a filler material and is applied at 6–9 lbs/cu. ft. density may be used. If a polymer calculation is again made at the described thickness limits it would be 4.3–13.02 oz/sq. yd.
5. Another option is to use a medium density or hybrid foam formed of mechanically frothed and chemically blown polyurethane foams. Such a mechanically frothed and chemically blown polyurethane foam is described, for example, in U.S. Pat. No. 6,372,810 hereby incorporated by reference herein.

The density of filled prime or virgin polyurethane foams can be controlled by limiting the amount of filler. For example, one can reduce the filler content to produce a prime polyurethane foam of about 6 lb. per cubic foot density.

Although the above examples have to do with polyurethane, a water based foam system can also be used. For example, the foam may be an SBR foam. Although a virgin polyurethane or polyurethane rebond foam or compressed particle foam (formed of compressible particles, chips, crumbs, etc.) may be preferred, it is to be understood that other compressible particles made from other foams (open cell, closed cell) or materials such as SBR foam, PVC foam, polyethylene foam, cork, rubber, crumb rubber, and/or the like may also be used. In particular, it is contemplated that in place of form, a felt or non-woven cushion may be utilized.

Regardless of the cushioning material used, it is contemplated that such material will preferably be characterized by a compression modulus such that a relatively soft feel is imparted to the user. By way of example only, it is contemplated that the cushioning material will preferably be characterized by a 50% compression at a load of between about 5 and about 70 psi and more preferably about 10 to about 30 psi when the isolated cushioning material is measured according to ASTM specification D3574 Test C (Compression Force Deflection Test).

As previously indicated, surface covering elements of any of the described constructions may include an optional backing layer 170 also referred to as a release layer or secondary backing. The optional backing layer 170 is preferably a woven or non-woven textile fabric of polyester, polypropylene, polyester/polypropylene, polyester/polypropylene/acrylic, or other appropriate fibers or blends and may contain a colorant, binder, or the like. According to one contemplated practice, the backing layer 170 may be a non-woven structure or felt of polyester fiber and polypropylene fiber, with about 50%–100% polyester. In another embodiment, a blend of 50% polyester fiber, 20% polypropylene, and 30% acrylic fibers may be used. The polyester, polypropylene and/or acrylic fibers may be of one or more selected colors to give the backing a desired color or appearance. In one embodiment, foam forming the cushioning layer and the backing layer 170 have a similar color. In a particular example, the foam and/or backing have a green, blue, purple, gray, white, black, brown, or gold color. The color of the backing can be achieved, for example, by using a white polyester fiber and a colored acrylic fiber or by using colored polyester and/or polypropylene fibers. In accordance with another example, an amount of black polyester fibers is blended with an amount of white polyester fibers, an amount of colored polyester fibers, and an amount of white polypropylene fibers to form a non-woven colored backing material or felt having the color of the colored polyester fibers and having a heathered or speckled look. The respective amounts of each type or color of fiber are selected to give the desired color, brightness, shrink, etc. If desired, the surface covering elements of any of the described constructions may also include an optional friction enhancing coating 180 (FIG. 13D) which may be applied in either a substantially continuous or patterned arrangement. By way of example only and not limitation, such friction enhancing coatings may include latex, hot melt adhesives, and the like. Also, although it is not preferred, the coating 180 may be covered with a release sheet, layer or film.

According to one contemplated practice, the constructions forming the surface covering elements may be formed by a production process as shown in FIGS. 14A and 14B. According to this practice, a backing composite made up of the backing 170, the cushioning layer of foam 178 and the layer of reinforcement material 158 are flame laminated into a coordinated composite (FIG. 14A). Thereafter, as illustrated schematically in FIG. 14B, the formed composite is adjoined to the underside of the primary carpet fabric 112 by the tie coat adhesive 160. The formed structure is therafter cooled and cut to a desired shape. As will be appreciated, while this process makes use of a preformed foam cushioning layer it is likewise contemplated that the same structures may be formed utilizing continuous, in-line or in-situ formation practices. Such practices are illustrated and described in U.S. Pat. No. 6,203,881 to Higgins et al. the teachings of which are incorporated by reference as if fully set forth herein.

As will be appreciated, there exist a substantial number of alternative embodiments and configurations for layered constructions forming the surface covering elements for use in the flooring system of the present invention. By way of example only, in FIGS. 15A, 15B, 15C and 15D wherein elements corresponding to those previously described are designated by like reference numerals in a 500 series, pile constructions are illustrated corresponding substantially to those in FIGS. 13A–D respectively but wherein the reinforcing material 558 as previously described is held in suspended relation between layers of tie coat material such as the hot melt adhesive previously described. In such a construction, it is contemplated that the tie coat material 560 may be either in substantially discrete layers separated by the reinforcement material 558 or may migrate across the reinforcement material 558. In either event, due to the substantial adhesion between the tie coat material 560 and the reinforcement material 558, a substantially stable load distribution layer 557 is nonetheless established in bonding relation between the primary pile fabric 512 and the cushioning material 578. Of course, if desired a fiction enhancing coating as previously described may be disposed across the underside of the backing 570.

In accordance with one example and with reference again to FIGS. 15A–16D, the reinforcement material 558 may be a glass mat which is hot melt laminated to the foam 578 by a hot melt layer 560.

As illustrated in FIGS. 16A, 16B and 16C, wherein like components to those previously described are designated by corresponding reference numerals within a 600 series, it is contemplated that tufted loop pile and tufted cut pile constructions 610A and 610B may include a first layer of tie coat material 660 such as hot melt adhesive or the like extending away from the primary backing 622 and into contact with a sheet of reinforcement material 658 such as the non-woven glass or scrim material previously described. Thus, the tie coat material 660 serves the function of securing the tufts 620, 621 in place relative to the primary backing 622 thereby avoiding the need to utilize a separate latex or hot melt pre-coat. Accordingly, a single adhesive layer extends between the upper surface of the reinforcement material 658 and the underside of the primary backing 622. Of course, if desired a fiction enhancing coating as previously described may be disposed across the underside of the backing 670.

As illustrated in FIGS. 17A, 17B and 17C wherein like components to those previously described are designated by corresponding reference numerals within a 700 series, it is contemplated that tufted loop pile construction 710A, tufted cut pile construction 710B, and bonded cut pile construction 710C include a first layer of a tie coat material 760 extending away from the upper surface of a layer of reinforcement material 758 and which may be of a different character from a second layer of tie coat material 760' extending away from the lower surface of the reinforcement material. In all other respects, the configuration is substantially as illustrated and described in relation to FIGS. 16A, 16B and 16C respectively. By way of example only and not limitation, in the event that the reinforcement material 758 is disposed between two different adhesives, it is contemplated that the tie coat material 760 extending away from the upper surface of the reinforcement material 758 may be, for example, hotmelt, while the tie coat material 760' extending away from the lower surface of the reinforcement material 758 may be, for example, polyurethane forming composition, a low melt powder, low melt fibers, a low melt film, or the like. Of course, the tie coat material 760 and/or 760' may also comprise multiple layers of the adhesive. If desired, a fiction enhancing coating as previously described may be disposed across the underside of the backing 770.

In FIGS. 18A, 18B and 18C wherein like components to those previously described are designated by corresponding reference numerals within an 800 series, there are illustrated yet additional constructions for forming surface covering elements for use in covering a subfloor. In such embodiments, tufted loop pile construction 810A and tufted cut pile construction 810B, 810C include a layer of reinforcement material 858 disposed between a first layer of latex adhesive 824 extending away from the upper side of the reinforcement material 858 and a second layer of latex adhesive 824 extending away from the lower side of the reinforcement material 858. Thus, latex extends substantially between the upper surface of the cushion material 878 and the primary backing 822 with the layer of reinforcement material 858 disposed within such latex at an intermediate position. Such latex is preferably a carboxilated styrene butadiene rubber (SBR) latex. Of course it is also contemplated that similar constructions utilizing other adhesives such as Polyvinyl chloride (PVC), ethylene vinyl acetate (EVA), and acrylics as well as hot melts or polyurethanes as previously described may be useful. Of course, if desired a fiction enhancing coating as previously described may be disposed across the underside of the backing 870.

As previously indicated, it is contemplated that additional stability may be introduced by incorporating stabilizing elements in intimate relation to the primary backing of a tufted primary pile fabric. Exemplary embodiments incorporating such a configuration are illustrated in FIGS. 19A, 19B and 19C wherein like components to those previously described are designated by corresponding reference numerals within a 900 series. As illustrated therein, tufted loop pile construction 910A and tufted cut pile construction 910B, 910C include pile forming yarns 920, 921, 921' tufted through a primary backing 922 which incorporates therein a primary backing stabilizing layer 923 such as a woven or non-woven material or scrim. The primary backing stabilizing layer 923 may be adjoined to the primary backing 922 by a needling or calendering operation. In addition, point bonding may be achieved between the structures by incorporating heat activated adhesive fibers within the non-woven construction. In the event that a construction incorporating a primary backing stabilizing layer is utilized, it is contemplated that the pre-coat 924 and/or the reinforcement material 958 may be substantially reduced or eliminated entirely if desired due to the stability imparted to the enhanced primary backing 922, 923. If desired, a fiction enhancing coating as previously described may be disposed across the underside of the backing 970.

As will be appreciated, while the secondary backing or felt may be flame laminated to the underside of the cushioning material, it is also contemplated that other attachment mechanisms may be used if desired. By way of example only, it is contemplated that the secondary backing may be joined to the underside of the cushioning material by one or more layers of adhesive such as hot melt adhesive or the like as previously described. Exemplary cut pile constructions 1010A, 1010B for a surface covering element disposed in overlying relation to a subfloor 1011 are illustrated in FIGS. 20A and 20B, wherein elements corresponding to those previously described are designated by corresponding reference numerals within a 1000 series.

In accordance with yet another embodiment as shown in FIG. 21, which corresponds to FIG. 13D, the reinforcement material or layer 158 of load distribution layer has been eliminated. In this embodiment, the tie-coat lay 160 serves as the load distribution layer.

With reference to FIG. 22 which corresponds to FIG. 13D, still another embodiment is illustrated in which the backing layer of felt or other material 170 of FIG. 13D has been eliminated.

With reference to FIG. 23 which corresponds substantially to FIG. 19, in still yet another embodiment, the pre-coat layer 924, tie-coat layers 960, reinforcement layer 958, and backing layer 970 have been eliminated. The foam layer 978 may be adhered to the primary carpet fabric 921', 922, 923, for example, by flame lamination or by being applied directly thereto in a wet or uncured state and then cured.

The surface covering elements in the flooring system according to the present invention are preferably suitable for installation in a residential environment by a user with little or no experience with flooring installations. So as to improve the ease of installation, the surface covering elements disposed across the subfloor are preferably resistant to sliding movement across the subfloor once they are placed in position without the need for separately applied adhesives. However, the surface covering elements are preferably readily displaceable vertically away from the subfloor to facilitate replacement or repositioning during installation. As will be appreciated, the ability to lift and move the surface covering element to various positions across the subfloor a number of times without damaging either the surface covering element or the subfloor may be particularly desirable for an unskilled installer. In addition, in a residential environment, the ability to remove and replace or clean a stained or damaged surface covering element at an extended time after installation is desireable. Thus, in accordance with a potentially preferred practice, any friction enhancing coating disposed across the backing is preferably of a character which does not permanently bond to the subfloor. In addition, it is desirable that the friction enhancing coating does not permanently stick to itself so as to avoid undesired blocking attachment in back to back packaging (FIG. 25). Still further, it is desirable that any friction enhancing coating should not adhere to the surface of the primary carpet fabric so as to avoid undesired permanent adhesion if the surface covering elements are stored in roll form or stacked face to face (FIG. 26). That is, the friction enhancing coating preferably provides lateral grip with little or no vertical stick and with little or no blocking to itself or the face of the primary pile fabric.

The evaluation of various friction enhancing coating materials was carried out by conducting sliding friction and blocking tests in accordance with the following procedures.

Friction tests were performed by placing a 3"×3" piece of coated carpet tile on a smooth flat surface (a piece of laminate wood-like flooring). One end of the flat surface was raised at a rate of ~10 degrees per second. The center of the carpet tile was always placed 10 inches from the pivot point. The angle at which the carpet tile began to slip was recorded. No weight or pressure was applied to the sample, and both surfaces were visually inspected to be clean before the measurement was performed. Error bars are 5 degrees.

Instantaneous blocking tests were performed by placing two identically coated 3"×3" carpet tiles back-to-back with a 5 lb weight applied for 1 minute. A strip of aluminum foil was used to mask ½ inch of one edge. The force required to pull the samples apart was measured using an AccuForce III force meter from AMETEK.

Elevated temperature blocking tests at 70 degrees C. (158 degrees F.) were performed by placing two identically coated 3"×3" carpet tiles back-to-back with a 6.25 lb weight applied for at least 16 hours in a 70 C. oven. A strip of aluminum foil was used to mask ½ inch of one edge. After removing from the oven, samples were allowed to cool. They were pulled apart by pulling on the edge carpet tufts from the masked side of the tiles using an AccuForce III force meter from AMETEK. The peak force needed to separate the tiles was recorded.

Re-Stick friction tests were conducted to determine the reusability of the carpet friction enhancing or grip layer. A 3"×3" piece of coated carpet was placed on clean, laminate, wood-like flooring with a 5-lb weight applied. After 30 seconds, the weight and carpet were moved to a fresh section of the flooring. This was repeated such that the carpet was exposed to 5 positions. The results of a friction test as described above were then recorded.

Each of the above tests were carried out on samples of carpet tile having a construction substantially as set forth in Example 5 below. The coating in sample 1 was a latex marketed by National Starch & Chemical under the trade designation MULTILOCK 454A. The coating in sample 2 was a latex marketed by Rohm and Haas under the trade designation ROBOND PS-68. The coating in sample 3 was a latex marketed by Air Products and Chemicals under the trade designation AIRFLEX TL12. The coating in sample 5 was a hot melt adhesive marketed by H. B. Fuller under the trade designation HL6102. Control sample 5 was uncoated. The results are set forth in the following table.

| Sample | Dry add-on (gsm) | Instantaneous Blocking (lbs) | 70 deg C. Blocking (lbs) | Friction on Laminate (degrees) | Re-Stick Friction (degrees) |
|---|---|---|---|---|---|
| 1 | 30 | <0.7 | <0.7 | 85 | 80 |
| 2 | 20 | 0.7 | 1.3 | 48 | 45 |
| 3 | 30 | | 4.8 | 60 | |
| 4 | 20 | <0.7 | 2.7 | 45 | 45 |
| 5 | 0 | <0.7 | <0.7 | 20 | 20 |

Based upon these tests it was concluded that samples 1 and 2 exhibited potentially desirable friction and anti-blocking characteristics with sample 4 being adequate and sample 3 being undesirable. Of course, the samples tested are merely representative and other suitable coating materials no doubt exist. Exemplary materials may include various classes of latex including acrylics, EVA, SBR, and the like and hot melt materials including polyolefins, EVA, SBR, polyamides, and the like. Potentially preferred coating materials may include latex. The dry add-on ranges should preferably be less than about 65 gms per square meter, more preferably less than about 30 grams per square meter and most preferably less than about 20 grams per square meter.

The friction enhancing or grip reducing coatings may be applied to the back of the surface covering elements by various methods including roll coating, spray coating, impregnation, powder coating, and printing methods. After application of the coating, a drying and or curing process may be used depending on the form of the coating chosen.

Although a friction enhancing coating or chemical treatment is preferred, it is contemplated that one may use another releasable adhesive or material such as double sided tape, hook and loop releasable materials, spray adhesives, and the like.

As will be appreciated, due to the fact that the surface covering elements in the flooring system of the present invention are intended to support users who walk across the surface, it may be desirable to provide a controlled degree of cushioning within the various components of the surface covering construction to provide a controlled degree of cushioning to the users. It is believed that the cushioning function in the overall construction is derived from both the outwardly projecting yarns within the primary pile fabric 112 as well as from the foam or other cushioning material 178 disposed below the force distribution layer 157. Thus, the pile structure and cushioning material should be characterized by a sufficient deformation under load such that the final resulting desired level of compression is achieved.

As will be appreciated, compressibility character may be evaluated by a standard force deflection test such as set forth at ASTM Standard D-3574 Test C—Compression Force Deflection Test. By way of example only, and not limitation, in order to provide a desired degree of cushioning as may be required in a residential application, it is believed that the overall multi-layer construction 110A–D forming the surface covering element is preferably characterized by a compression modulus such that it is compressed at least 60% when subjected to an applied load of between about 150 to about 1000 psi.

As previously indicated and in accordance with at least one embodiment, there is preferably no visible seam between adjacent surface covering elements once they are installed across the subfloor. It is believed that the ability to reduce the appearance of visible seams may be enhanced by the combination of yarn coloration, surface character and edge cut character of the surface covering elements.

As regards coloration, it is contemplated that the individual surface covering elements may be either patterned or may have a substantially uniform coloration across the surface. In the event that the surface covering elements are intended for residential application, a substantially uniform coloration may be preferred so as to reduce installation complexity. However, it is believed that a heather or mottled coloration may be useful in reducing seam appearance. The application of such heather coloration schemes is disclosed in pending U.S. patent application Ser. Nos. 10/139,019 filed May 3, 2002 and 10/167,185 filed Jun. 11, 2002 the teachings of both of which are incorporated by reference in their entirety as if fully set forth herein.

As regards surface character, the hiding of seams is believed to be a function of both the length of the yarn and the filling character of the yarn along the edge. The filling character of the yarn is, in turn, a function of both the bulk of the yarn as well as the normal density of the yarns disposed along the edge. By the term "normal density" is meant the population density prior to any damage from cutting.

The following table outlines exemplary and potentially preferred construction features for a pile fabric of tufted construction which are believed to provide the desired surface character to hide seams between the various tiles.

As previously noted, the yarns utilized preferably incorporate a substantial degree of twist which adds to the bulk of the yarns due to the kink at the terminal ends of the yarns. As will be appreciated, this kinking gives rise to a phenomenon wherein the naturally occurring pile height is actually less than the extended length of the yarns forming the pile. That is, the individual yarns forming the pile may be pulled straight to extend past the height of the surrounding pile yarns. As indicated previously, this phenomenon lends a substantial cushioning effect to the primary pile fabric. This kink also causes portions of the pile yarns immediately adjacent to the edge of the surface covering element to extend outboard of the edge and to intermingle with complementary outwardly extending portions of edge yarns on the immediately adjacent surface covering element. In order to provide this cross-over bridging engagement, the yarn within the primary pile fabric is preferably characterized by an extended length above the primary backing in the range of about 0.25 inches or higher and more preferably in the range of about 0.4 to about 1.5 inches and most preferably in the range of about 0.6 inches. In this regard, it is to be understood that by the term "extended length" is meant the length of the yarn above the primary backing when the yarn is pulled straight.

In order to reduce seam appearance, it is also believed to be important to avoid substantial damage of the pile forming yarns in the region immediately adjacent to the edge. That is, the yarns at the edge are preferably not sheared or pulled out of the primary backing during cutting. In order to evaluate the integrity of edges in surface covering elements incorporating pile fabric coverings, the following procedure has been developed.

1. Arrange the element to be analyzed such that the edge of interest can be easily viewed at 9×. The sample must be able to be moved smoothly under the microscope, so as to make a count along a significant length (at least 6 or more inches, for example). Decide upon an appropriate length of edge upon which to make a count. Measure that length and establish the beginning and ending point for the observations to be made.
2. Begin at one end of the distance to be measured and move sequentially from yarn to yarn along that length. Examine each yarn along the length.
3. During examination only consider those yarns that are immediately adjacent to or involved in the actual cut. Yarns not at the edge (behind another, for example) are not considered as appropriate to count. Yarns that have been cut below the surface (within the adhesion material) and having no protruding filaments are not considered in these counts.
4. Gently move each yarn, as necessary, to determine if any of the filaments that comprise it have been cut. If more than three of the filaments have been completely severed, that yarn is determined to be 'cut' yarn and is counted as such.
5. Determine the 'cut status' (cut or not cut) for that particular yarn, then move to the next adjacent yarn. Continue until you reach the end of the distance over which you wish to make counts.
6. By dividing the total number of affected (cut) yarns by the measured distance of the edge involved, compute the number cut per unit length for that edge.

Edge character evaluated according to the above method is preferably such that less than about 50 percent of the piles along the edge are cut and more preferably less than about 40% of the piles along the edge are cut and most preferably less than about 25% of the piles along the edge are cut.

In order to prevent edge yarns from being cut, it is contemplated that the Individual surface covering elements be stamped or cut from a precursor or composite of larger dimensions by controlled depth cutting from the back using, for example, controlled depth die cutting (FIGS. 24A, 24B) using a displaceable strike plate 61 that extends during cutting (FIG. 24B) such that a plurality of supporting pin elements 63 define the supporting surface surrounding the cut edge during the cutting operation. The preferred die cut blade is a steel rule die with scalloped or serrated edges. Other forms of cutting such as laser, water jet, rotary reciprocating blade, band saw, and the like may be used.

By using a dye cutting procedure as illustrated in FIGS. 24A and 24B it has been found that the percentage of cut piles in the vicinity immediately adjacent the edge of the resulting segmented material can be dramatically reduced. By way of example only, the following table sets forth the results of an analysis of exemplary tufted pile material controlled depth cut from behind in comparison to similar tufted pile materials cut completely through from the face. The analysis was carried out using the procedure as outlined above.

| | Cut Pile Evaluation | | | | |
|---|---|---|---|---|---|
| | End Cuts Cross Tufting Direction Total Counted End 1* | Total Cut End 1* | | Total Counted End 2** | Total Cut End 2** |
| Front Cut Sample A | 137 | 114 | 83.2% | 93 | 18 | 19.4% |
| Front Cut Sample B | 141 | 92 | 65.2% | 111 | 23 | 20.7% |
| Back Cut Sample A | 99 | 19 | 19.2% | 95 | 15 | 15.8% |
| Back Cut Sample B | 99 | 23 | 23.2% | 102 | 14 | 13.7% |

*End with yarns bent towards edge.
**End with yarns bent away from edge.

Thus, by incorporating controlled depth rear cutting that cuts through the primary backing but not the face yarns, tuft damage adjacent to the edge may be substantially reduced to about 25% or less.

While various potentially prefered constructions have been illustrated and described, it is contemplated that a wide range of alternatives may exist within the scope of the present invention. By way of example only, and not limitation, the following table details various contemplated variants for each component in a surface covering composite as previously described.

| | | Possible Range | |
|---|---|---|---|
| (A) | (B) | Low | High |
| 1. Product Type: | Residential Modular Product | | |
| 2. Face: | loop pile, cut & loop pile, tufted cut-pile, bonded cut-pile, woven, knit, nonwoven, or textured pile | | |
| 3. Primary Backing: | Nonwoven polyester, nonwoven polypropylene, or woven propylene with nylon needlepunched cap, woven polypropylene with a polypropylene cap, woven polypropylene with a polyester cap and low melt polyester binder | | |
| 4. Total Finished Yarn Weight: | oz/yd$^2$ | 12 | 70 |
| 5. Stitches Per Inch: | | 5 | 14 |
| 6. Tufting Gauge: | 1/8, 1/10, 5/64 | 5/32 | 1/10 |
| 7. Yarn Polymer: | Nylon 6,6, Nylon 6, Polyester, Polypropylene, Wool, or Wool/Nylon blend | | |
| 8. Yarn Type: | Filament, spun, or staple | 900 | 2800 |
| 9. Yarn Twist: | | 3 | 8 |

-continued

| (A) | (B) | Possible Range Low | Possible Range High |
|---|---|---|---|
| 10. Yarn Ply: | Twisted - 2 ply, 3-ply, 4 ply, unplied singles yarn, or air entangled yarn; Cabled - 2 ply, 3 ply or 4 ply | | |
| 11. Heatset: | Heatset or non heatset yarn; heatset frieze without steam | 250 | 275 |
| 12. Yarn Size: | | 2.90/2 | 1.90/2 |
| 13. Tufted Pile Height: | Inches | 1/8 | 2 |
| 14. Dyeing Method | Jet dye, flood dye, yarn dye, space dye, combination flood dye & jet dye, or beck dye (may also be printed or graphics tufted) | | |
| 15. Precoat Adhesive: | Styrene Butadiene Latex, hot melt, ethyl vinyl acetate, acrylic, polyvinyl chloride, or no precoat adhesive (may include anti-microbial agent) | 8 | 40 |
| 16. Lamination Tiecoat Adhesive: | Hotmelt with a bitumen and polypropylene resin base, polypropylene hot melt, bitumen hot melt, polyethylene hot melt, or polyurethane styrene butadiene rubber | | |
| 17. Upper Tiecoat Coating Weight: | oz/yd$^2$ | 20 | 70 |
| 18. Stabilizing Reinforcement: | Fiberglass mat with modified acrylic binder, no reinforcement, fiberglass scrim, polyester scrim, or fiberglass mat with urea formaldehyde binder or melamine binder | 0.9 oz./yd.$^2$ | 3.5 oz./yd.$^2$ |
| 19. Lower Tiecoat Coating Weight: | oz/yd$^2$ (or flame lamination) | 0 | 35 |
| 20. Cushion Type: | Rebond polyurethane foam, virgin filled polyurethane foam, prime polyurethane foam, styrene butadiene rubber foam, polyethylene foam, polyvinyl chloride foam, or nonwoven felt | | |
| 21. Cushion Thickness | Millimeters (prelamination) | 1 | 18 |
| 22. Cushion Density | lbs/ft$^3$ | 5 | 25 |
| 23. Release Layer construction: | Nonwoven or woven | | |
| 24. Release Layer composition | % polyester/ % polypropylene blend | 0%/100% | 100%/0% |
| 25. Release Layer weight: | oz/yd$^2$ | 1 | 6 |
| 26. Modular Shape: | square, rectangle, single chevron, two sided double chevron, four sided double chevron, hexagon, single chevron, multi-chevron, double axe head, tomahawk, sine wave edge (double-sided or four sided), bone, etc. | | |
| 27. Modular Size: | Inches per side (or inches of width for roll product) | 4 | 72 |
| 28. Cutting Method: | Controlled depth or full depth | | |
| 29. Preferred Colors | Solids (Beige, Green, Blue, Gray, Pink, Brown, Taupe, White, Red), heathers, patterns, designs, or combinations thereof | | |

The present invention may be further understood by reference to the following non-limiting examples:

EXAMPLES 1–5

The following examples set forth production specifications or overall floor covering composite constructions

EXAMPLE 1

| (A) | (B) |
|---|---|
| 1. Product Type | Residential Modular Floor Covering |
| 2. Face: | High Twist Frieze Cut pile |
| 3. Primary Backing: | Woven polypropylene (PolyBac - 4 oz/yd$^2$) |
| 4. Total Finished Yarn Weight: | 38 oz/yd$^2$ |

-continued

| (A) | (B) |
|---|---|
| 5. Stitches Per Inch: | 7.81 |
| 6. Tufting Gauge: | 1/8 |
| 7. Yarn Polymer: | Nylon 6,6 |
| 8. Yarn Type: | 1180 filament, with antistat, semi dull trilobal, 17 dpf |
| 9. Yarn Twist: | 7.50 twist per inch in singles (S) and ply (Z) |
| 10. Yarn Ply: | 2 ply twisted |
| 11. Heatset: | Yes, @ 260 to 264° F. with steam frieze |
| 12. Yarn Size: | 3.69/2 cotton count |
| 13. Tufted Pile Height: | 48/64 inches (3/4") |
| 14. Dyeing Method | Jet Dye |
| 15. Precoat Adhesive: | Styrene Butadiene Latex, 12 oz/yd$^2$ coating weight |
| 16. Lamination Tiecoat Adhesive: | Hotmelt with a bitumen and polypropylene resin base, |

-continued

| (A) | (B) |
| --- | --- |
| 17. Upper Tiecoat Coating Weight: | 46 oz/yd$^2$ |
| 18. Stabilizing Reinforcement: | Fiberglass Mat, 2 oz/yd$^2$, modified acrylic binder |
| 19. Lower Tiecoat Coating Weight: | 15 oz/yd$^2$ |
| 20. Cushion Type: | Rebond polyurethane foam, 7 millimeter uncompressed chip size |
| 21. Cushion Thickness | 7 millimeter (prelamination) |
| 22. Cushion Density | 9 lbs/ft$^3$ |
| 23. Cushion Weight | 30 oz/yd$^2$ |
| 24. Backing Layer construction: | Nonwoven felt |
| 25. Backing Layer composition | 70% polyester/30% polypropylene blend |
| 26. Backing Layer weight: | 4 oz/yd$^2$ |
| 27. Modular Shape: | 18" square or nominal 18" × 19" two-side double chevron |
| 28. Modular Size: | 18" square or nominal 18" × 19" |
| 29. Cutting Method: | Controlled Depth cut from the back |

EXAMPLE 2

| (A) | (B) |
| --- | --- |
| 1. Product Type | Residential Modular Floor Covering |
| 2. Face: | High Twist Frieze Cut pile |
| 3. Primary Backing: | Woven polypropylene (PolyBac - 4 oz/yd$^2$) |
| 4. Total Finished Yarn Weight: | 38 oz/yd$^2$ |
| 5. Stitches Per Inch: | 7.81 |
| 6. Tufting Gauge: | 1/8 |
| 7. Yarn Polymer: | Nylon 6,6 |
| 8. Yarn Type: | 1180 filament, with antistat, semi dull trilobal, 17 dpf |
| 9. Yarn Twist: | 7.50 twist per inch in singles (S) and ply (Z) |
| 10. Yarn Ply: | 2 ply twisted |
| 11. Heatset: | Yes, @ 260 to 264° F. with steam frieze |
| 12. Yarn Size: | 3.69/2 cotton count |
| 13. Tufted Pile Height: | 48/64 inches (3/4") |
| 14. Dyeing Method | Jet Dye, |
| 15. Precoat Adhesive: | Styrene Butadiene Latex, 12 oz/yd$^2$ coating weight |
| 16. Lamination Tiecoat Adhesive: | Hotmelt with a bitumen and polypropylene resin base, |
| 17. Upper Tiecoat Coating Weight: | 46 oz/yd$^2$ |
| 18. Stabilizing Reinforcement: | Fiberglass Mat, 2 oz/yd$^2$, modified acrylic binder |
| 19. Lower Tiecoat Coating Weight: | 15 oz/yd$^2$ |
| 20. Cushion Type: | Rebond polyurethane foam, 7 millimeter uncompressed chip size |
| 21. Cushion Thickness | 7 millimeter (prelamination) |
| 22. Cushion Density | 6.3 lbs/ft$^3$ |
| 23. Release Layer construction: | Nonwoven felt |
| 24. Release Layer composition | 70% polyester/30% polypropylene blend |
| 25. Release Layer weight: | 4 oz/yd$^2$ |
| 26. Modular Shape: | square or two-side double chevron |
| 27. Modular Size: | 23" square or nominal 23" × 23" |
| 28. Cutting Method: | Controlled Depth cut from the back |

EXAMPLE 3

| (A) | (B) |
| --- | --- |
| 1. Product Type | Residential Modular Floor Covering |
| 2. Face: | High Twist Frieze Cut pile |
| 3. Primary Backing: | Woven polypropylene (PolyBac - 4 oz/yd$^2$) |
| 4. Total Finished Yarn Weight: | 28–55 oz/yd$^2$ |
| 5. Stitches Per Inch: | 7.3–7.81 |
| 6. Tufting Gauge: | 1/8 |
| 7. Yarn Polymer: | Nylon 6,6 |
| 8. Yarn Type: | 1180 filament, with antistat, semi dull trilobal, 17 dpf |
| 9. Yarn Twist: | 7.50 twist per inch in singles (S) and ply (Z) |
| 10. Yarn Ply: | 2 ply twisted |
| 11. Heatset: | Yes, @ 260 to 264° F. with steam frieze |
| 12. Yarn Size: | 3.69/2 cotton count |
| 13. Tufted Pile Height: | 48/64 inches (3/4") |
| 14. Dyeing Method | Jet Dye, Millitron ® jet dye machine |
| 15. Precoat Adhesive: | Styrene Butadiene Latex, 12 oz/yd$^2$ coating weight |
| 16. Lamination Tiecoat Adhesive: | Hotmelt with a bitumen and polypropylene resin base, |
| 17. Upper Tiecoat Coating Weight: | 46 oz/yd$^2$ |
| 18. Stabilizing Reinforcement: | Fiberglass Mat, 2 oz/yd$^2$, modified acrylic binder |
| 19. Lower Tiecoat Coating Weight: | 15 oz/yd$^2$ |
| 20. Cushion Type: | Rebond polyurethane foam, 7 millimeter uncompressed chip size |
| 21. Cushion Thickness | 7 millimeter (prelamination) |
| 22. Cushion Density | 9 lbs/ft$^3$ |
| 23. Cushion Weight | 30 oz/yd$^2$ |
| 24. Release Layer construction: | Nonwoven felt |
| 25. Release Layer composition | 70% polyester/30% polypropylene blend |
| 26. Release Layer weight: | 4 oz/yd$^2$ |
| 27. Modular Shape: | square or two-side double chevron |
| 28. Modular Size: | 24" square or nominal 24" × 24" |
| 29. Cutting Method: | Controlled Depth cut from the back |

EXAMPLE 4

| (A) | (B) |
| --- | --- |
| 1. Product Type: | Residential Modular Floor Covering |
| 2. Face: | High Twist Frieze Cut pile |
| 3. Primary Backing: | Woven polypropylene (PolyBac - 4 oz/yd$^2$) with a heavy cap of low melt fibers calendared to bond the polypropylene together |
| 4. Total Finished Yarn Weight: | 36 oz/yd$^2$ |
| 5. Stitches Per Inch: | 7.3 |
| 6. Tufting Gauge: | 1/8 |
| 7. Yarn Polymer: | Nylon 6,6 |
| 8. Yarn Type: | 1190 filament, with antistat, semi dull trilobal, 17 dpf |
| 9. Yarn Twist: | 7.50 twist per inch in singles (S) and ply (Z) |
| 10. Yarn Ply: | 2 ply twisted |
| 11. Heatset: | Superba, @ 260 to 264° F. with steam frieze |
| 12. Yarn Size: | 3.69/2 cotton count |
| 13. Tufted Pile Height: | 48/64 inches (3/4") |
| 14. Dyeing Method | Jet Dye, Millitron ® jet dye machine, 20 gauge pattern |
| 15. Precoat Adhesive: | Styrene Butadiene Latex, 12 oz/yd$^2$ coating weight |

-continued

| (A) | (B) |
|---|---|
| 16. Lamination Tiecoat Adhesive: | Hotmelt with a bitumen and polypropylene resin base, |
| 17. Upper Tiecoat Coating Weight: | 46 oz/yd$^2$ |
| 18. Stabilizing Reinforcement: | Fiberglass Mat, 2 oz/yd$^2$, modified acrylic binder |
| 19. Lower Tiecoat Coating Weight: | 15 oz/yd$^2$ |
| 20. Cushion Type: | Rebond polyurethane foam, 15 millimeter uncompressed chip size |
| 21. Cushion Thickness | 7–8 millimeter (prelamination) |
| 22. Cushion Density | 6 lbs/ft$^3$ |
| 23. Release Layer construction: | Nonwoven felt |
| 24. Release Layer composition | 100% polyester |
| 25. Release Layer weight: | 2.5 oz/yd$^2$ |
| 26. Modular Shape: | square or wave pattern |
| 27. Modular Size: | 18"–36" |
| 28. Cutting Method: | Controlled Depth cut from the back |
| 29. Preferred Install | Without glue, Ashlar |

EXAMPLE 5

| (A) | (B) |
|---|---|
| 1. Product Type: | Residential Modular Floor Covering |
| 2. Face: | High Twist Frieze Cut pile |
| 3. Primary Backing: | Enhanced backing of woven polypropylene with needled and calendered polyester and low melt polyester |
| 4. Total Finished Yarn Weight: | 39 oz/yd$^2$ |
| 5. Stitches Per Inch: | 7.69 |
| 6. Tufting Gauge: | 1/8 |
| 7. Yarn Polymer: | Nylon 6,6 |
| 8. Yarn Type: | 1180 filament, with antistat, semi dull trilobal, 17 dpf |
| 9. Yarn Twist: | 7.50 twist per inch in singles (S) and ply (Z) |
| 10. Yarn Ply: | 2 ply twisted |
| 11. Heatset: | Yes, @ 260 to 264° F. with steam frieze |
| 12. Yarn Size: | 3.69/2 cotton count |
| 13. Tufted Pile Height: | 48/64 inches (3/4") |
| 14. Dyeing Method | Jet Dye |
| 15. Precoat Adhesive: | Styrene Butadiene Latex, 8 oz/yd$^2$ coating weight |
| 16. Lamination Tiecoat Adhesive: | Hotmelt with a bitumen and polypropylene resin base, |
| 17. Tiecoat Coating Weight: | 46 oz/yd$^2$ |
| 18. Stabilizing Reinforcement: | Fiberglass Mat, 2 oz/yd$^2$, modified acrylic binder |
| 19. Flame Lamination | Fiberglass mat flame laminated to foam |
| 20. Cushion Type: | Rebond polyurethane foam, 15 millimeter uncompressed chip size |
| 21. Cushion Thickness | 7–8 millimeter (prelamination) |
| 22. Cushion Density | 6 lbs/ft$^3$ |
| 23. Flame Lamination | Felt flame laminated to foam |
| 24. Release Layer construction: | Nonwoven felt |
| 25. Release Layer composition | 70% polyester/30% polypropylene blend |
| 26. Release Layer weight: | 4 oz/yd$^2$ |
| 27. Modular Shape: | 18" square or nominal 23" × 23" two-side double chevron |
| 28. Modular Size: | 18" square or nominal 23" × 23" |
| 29. Cutting Method: | Controlled Depth cut from the back |

COMPARATIVE EXAMPLES 6–17

In the following comparative examples samples tested were as follows:

| Sample Designation | Material |
|---|---|
| A | Residential carpet tile prototype built by Applicants with pinstripe surface texturing tufted at 10.48 stitches per inch with a yarn weight of 38.39 ounces per square yard. The primary pile fabric is adjoined to a high density prime urethane foam having a density of 16 lbs per cubic foot by a layer of hot melt adhesive with a 2 ounce layer of glass reinforcement material between the hot melt and the foam. A felt backing is as described in Example 5 is disposed across the underside of the foam. |
| B | A residential carpet tile prototype built by Applicants with a construction identical to sample "A" but with a standard cut pile face of off-white color. |
| C | Residential carpet tile prototype built by Applicants having a cut pile tufted construction of 8.68 stitches per inch with a yarn weight of 22.79 ounces per square yard and a deep golden speckled surface coloration. The primary pile fabric was adjoined to an underlying cushion with felt backing as in sample "A" including hot melt and glass reinforcement. |
| D | A potentially preferred residential carpet tile with rebond cushion corresponding substantially to the specification is set forth in Example 5 above. |
| E | Commercially available carpet tile sold under the trade designation GRAND PLAZA by Milliken & Company. |
| F | Commercially available broadloom carpet sold under the trade designation PATTERN MATES by Milliken & Company and having a face weight of 38 ounces per square yard. |
| G | Commercially available broadloom carpet sold under the trade designation PATTERN MATES by Milliken & Company and having a face weight of 55 ounces per square yard. |
| H | Broadloom carpet having attached cushion of prime urethane and a scrim backing marketed under the trade designation BUCKSKIN by Cherokee Carpet Industries. |
| I | Carpet having a nylon cut pile face tufted at 9.33 stitches per inch at a pile height of 0.64 inches with a pile weight of 36 ounces per square yard. This product is marketed under style number SP120 by Mohawk Industries, Inc. |
| J | Carpet marketed by Philadelphia Carpets under the trade designation CALM 12 having a face weight of 30 ounces per square yard and a tufted pile height of 0.375 inches. |
| K | Loop pilecarpet marketed by Mohawk Industries under style number SP117 having a pile height of 0.160 inches with 5.0 stitches per inch and a certified pile weight of 26.00 ounces. |
| L | Loop pile carpet product marketed under the trade designation ROAD RUNNER by Milliken & Company |
| M | Bonded carpet product marketed under the trade designation WHITE WATER by Milliken & Company. |
| N | Carpet tile having a textured loop surface and a felted backing. |
| O | Bonded pile surface carpet tile having a pile height of 0.245 inches and finished pile weight of 28 ounces per square yard marketed under the trade designation COLOR ACCENTS by Milliken & Company. |

COMPARITIVE EXAMPLE 6

The compression of the face only for various samples was tested using ASTM specification D3574 Test C. (Compression Force Deflection Test) modified to measure 60% compression at reading. The results are tabulated below.

| Sample | Compression modulus (psi) |
|---|---|
| I | 12.802 |
| A | 87.968 |
| B | 125.267 |

-continued

| Sample | Compression modulus (psi) |
|---|---|
| J | 148.987 |
| G | 190.794 |
| L | 251.773 |
| H | 326.901 |
| E | 354.99 |
| F | 500.864 |
| C | 608.977 |
| K | 753.888 |
| M | 1063.683 |
| O | 1149.635 |

COMPARATIVE EXAMPLE 7

The procedure of Example 6 was repeated in all respects except that the compression modulus was to the entire sample composite.

| Sample | Compression modulus (psi) |
|---|---|
| D | 261.408 |
| H | 280.936 |
| A | 285.452 |
| B | 368.239 |
| L | 602.084 |
| C | 777.584 |
| N | 1066.748 |
| O | 1146.429 |
| E | 1515.57 |
| M | 2121.788 |

COMPARATIVE EXAMPLE 8

The procedure of Example 6 was repeated except that force was measured at 50% compression. The tested portion of the sample consisted only of the foam pad, fiberglass reinforcing layer and hot melt tie-coat layer.

| Sample | Compression modulus (psi) |
|---|---|
| D | 23.444 |
| B | 32.672 |
| C | 33.635 |
| A | 36.252 |
| E | 72.074 |
| N | 73.987 |

COMPARATIVE EXAMPLE 9

The procedures of Example 6 were repeated in all respects except that force was measured at 50% compression.

| Sample | Compression modulus (psi) |
|---|---|
| Cushion only from sample "D" | 13.389 |
| 4 lb rebond foam underlay from Mohawk Industries | 11.285 |
| 6 lb rebond foam underlay from Mohawk Industries | 12.405 |
| 8 lb rebond foam underlay from Mohawk Industries | 51.052 |

COMPARATIVE EXAMPLE 10

Compression recovery was measured for various samples. A constant force of 200 pounds was applied to the test specimen. Two complete cycles of loading and relief were applied and the load modulus for each cycle was recorded. The average percentage change of the sample between the first cycle and the second cycle is reported based on the following formula.

$$\frac{(\text{Height at valley} - \text{Height at peak}) \text{ second cycle}}{(\text{Height at valley} - \text{Height at peak}) \text{ first cycle}}$$

| Sample | Recovery % |
|---|---|
| D | 63.5 |
| C | 68.2 |
| H | 70.1 |
| B | 72.3 |
| A | 72.4 |
| E | 80.5 |
| O | 81.7 |

COMPARATIVE EXAMPLE 11

Planar dimensional stability of various samples was tested by loading a two inch wide strip in a tensile tester and measuring percent elongation.

| Sample | % elongation (100 lbs force) |
|---|---|
| D | 5.6 |
| H | 13.9 |
| O | 2.4 |

COMPARATIVE EXAMPLE 12

This example procedure provides for a measurement of resistance to deformations that would cause a carpet tile to go from square to trapezoidal, for instance, due to a shear force on one side of the carpet. The measurement data were collected using a Sintech 1/s mechanical tester controlled by MTS's Testworks 4 software. As the sample is subjected to a shearing force, the force required to shear versus displacement of one end of the sample is measured. More specifically, 1. The setup includes two hydraulic jaws with a gap of 2.5 inches between then laterally. One jaw is fixed and the other is attached to the movable head of the Sintech mechanical tester. A 500-pound load cell was used on the movable head.
2. 2×8 inch strips of carpet are cut using a die. The carpet sample is loaded with the long direction horizontal. The gap between the hydraulic jaws is 2.5 inches so that 5.5 inches of the carpet sample is firmly held (symmetrically) by the two hydraulic jaws on either side of the sample.

3. The two hydraulic jaws are originally set at the same height (with a gap of 2.5 inches laterally between them). The movable jaw cycles from the same height as the fixed jaw through a displacement of 0.5 inch, first higher than the stationary jaw, and then lower than the stationary jaw, and then returns to its starting point. This defines a single cycle of deformation.
4. As the shear deformation cycle progresses, the force versus displacement cycle is recorded. The data shows a hysteretic behavior.
5. To measure the initial shear modulus of the carpet, the slope of the shear force versus shear displacement is calculated for the data from 0–0.08 inch displacement. The resulting initial modulus data are not normalized by the dimensions of the sample.
6. To calculate the Energy (or work) dissipated during the deformation cycle, the area between the forward and reverse shear deformation curves (the curves are hysteretic) is calculated. The resulting energy dissipated data are not normalized by the dimensions of the sample.

The results are set forth in the following table.

| Sample | Initial modulus (lbF/in) | Energy (lbF*in) |
|---|---|---|
| H | 9.73 | 1.39 |
| D | 181.02 | 15.55 |
| E | 294.73 | 20.35 |

COMPARATIVE EXAMPLE 13

The ability of various samples to abut across a flooring surface without seam visibility was evaluated as a function of a developed index referred to as a Seamability Index.

The Seamability Index is defined by the mathematic visibility of the seam in a digital image of the seam. The RGB digital images were captured using a Javelin Electronics Chromachip II model JE3462RGB camera in manual mode. The lighting used was fluorescent room lights. Illumination was set through the iris on the lens. The RGB histogram of the image was checked in Adope Photoshop 6.0 to make sure none of the pixels were clipped at 0 or 255 (8 bit data storage). The camera was placed 33 inches above the sample and captured 480×640 pixel resolution images that spanned roughly 8.5×11.5 inches. The carpet seam was aligned within the image to go parallel to one of the edges of the image so that line averaging could be done across the whole image in one direction. For seams that are not linear, Adobe Photoshop 6.0 was used to piecemeal cut the image and paste the seams together in a line. The seam shape can be marked within the image by placing a marker in the shape of the seam parallel to the seam.

To prepare the images, two identical tiles were used. The two tiles were seamed in every possible configuration with the tile tufting direction oriented in the same direction. To put the seam in a known configuration, the seam was brushed perpendicularly to the seam with a light hand brushing in a single direction.

The seam is made difficult to identify because of the hiding action of overhanging tufts, printed patterns, three dimensional texturing, etc. To quantify a seam, the deviations due to the seam in the image from the average color value of the base carpet must be quantified. Because there are variations in the image of the carpet that occur regardless of a seam simply due to the bright and shadow points of the tufts (or loops) in the carpet, or other patterns, printing, etc., there are at least two types of variability in the image of a carpet seam. The standard deviation of the color differences from the average color value in the absence of a seam is used to characterize the variability intrinsic to the carpet (in the absence of a seam). Because the tufts, loops, printing, or physical texture of the carpet causes very rapid changes in the digital image's pixel values within a small neighborhood, data averaging is utilized to obtain data with a large signal (seam) to noise (base carpet variability) value. The Seamability calculation is based on data averaged over 8 inches in a single direction along a line parallel to the seam. This analysis is generally applicable to carpet substrates where the carpet base is one color or where the texture or printing has the tendency to average to a uniform background over the 8 inch sampling interval used in this test protocol.

The RGB image files are converted to Adobe Lab space within Adobe Photoshop 6.0. The L, a, and b pixel intensity data are each individually averaged in the image in a direction parallel to the seam for a distance of 8 inches to create a line profile of the average intensity in each channel. This brings out the seam information relative to the texture. From this line profile, the average value of L, a, and b for the carpet can be calculated by averaging along the line profile all of the pixel values (except at the seam). The deviation from the average value along the line can be calculated so that one has $(L-L_{avg})$, $(a-a_{avg})$, and $(b-b_{avg})$ line data. The $(L-L_{avg})$, $(a-a_{avg})$, and $(b-b_{avg})$ line data are then combined using a color difference formula:

$$\Delta E(\text{color difference}) = ((L-L_{avg})^2 + (a-a_{avg})^2 + (b-b_{avg})^2)^{1/2}.$$

The standard deviation of the delta E of the carpet texture, (sigma) is next calculated from the delta E line spectra (except in the region of the line that reflects the seam. Then, the point along the delta E line with the maximum deviation (delta E) from the average is found. The value of delta E is recorded. Then the ratio of the maximum deviation (delta E) to the standard deviation (sigma) is calculated as a measure of whether a seam is present or not. The value delta E/sigma also gives a numeric quality measure to the seam. Because of the way that a standard deviation is defined, a Seamability index of 3 or less is probably just the base carpet (95% chance). This would mean that there is no seam present. A large Seamability Index indicates that there is probably a seam present. The larger the Index is, the more noticeable the seam is. The data analysis was performed in Image Pro Plus 4.5. The data was averaged in a line using a standard line-averaging tool. The standard deviation (sigma) and maximum deviation (delta E) were calculated from the line profile using macros written in-house using Image Pro Plus macro language.

The results are tabulated in the following table.

| Sample | Average Seam Index | Seam 1 | Seam 2 | Seam 3 | Seam 4 |
|---|---|---|---|---|---|
| A | 3.50 | 3.06 | 4.87 | 3.04 | 3.02 |
| B | 7.36 | 4.13 | 12.78 | 5.72 | 6.82 |
| C | 6.74 | 4.45 | 8.36 | 3.52 | 10.64 |

-continued

| Sample | Average Seam Index | Seam 1 | Seam 2 | Seam 3 | Seam 4 |
|---|---|---|---|---|---|
| D (Dark Green) | 2.95 | 3.02 | 2.82 | 3.33 | 2.62 |
| D (Beige) | 3.92 | 4.84 | 4.12 | 3.16 | 3.56 |
| D (Light Blue) | 2.70 | 3.10 | 2.37 | 2.40 | 2.93 |
| N | 3.98 | | 2.30 | 5.64 | 2.36 |
| O | 6.72 | 8.52 | 2.96 | 7.75 | 7.65 |

COMPARATIVE EXAMPLE 14

A measurement of relative tuft overlay along the perimeter of various samples was conducted.

For purposes of this example, "Tuft Overlay" is defined as the area produced by tufted yarns exceeding an invisible plane created by the outer edges, perpendicular to the carpet tile backing, enabling the measurability through electronic image capture and computer image analysis.

Sample Prep:
1. Brush the tufted face with an 8-inch medium bristled brush applying moderate pressure perpendicular to the perimeter edge as to maximize tuft overlay.

Image Capture:
2. Place carpet tile (tufted face up) onto the glass scanner bed utilizing the full length of scanning surface.
3. Use Umax's Magic Scan software using default settings to capture scanned images.
4. All samples are scanned using 200 dpi and saved as True Color RGB tif images
5. Use Abode Photoshop version 6.0 Software to convert images to Lab color space and to split an image into three images each representing one axis in Lab color space.
6. The three newly saved images a then opened using Image Pro Plus version 4.5 image analysis software.
7. The images are rotated as to display the edge horizontally on the monitor.
8. The color channel image with the most pixel image data in relation to the area of interest (the tuft overlay region) is then threshold automatically based on detected area size maximum and minimum parameters and gray level values.
9. The detected isolated area is then measured to determine area size and then divided by the width (longest aspect of image—represents carpet tile edge length), resulting in the average tuft overlay distance in millimeters along the length of the scanned carpet tile edge.

The results for each of four sides of a representative carpet tile are set forth in the following table.

| Sample # | Side | Tuft Overlay Avg Overhang along side (mm) | Avg Overhang per Tile (mm) |
|---|---|---|---|
| D | 1* | 9.48 | |
|  | 2 | 2.49 | |
|  | 3 | 6.10 | |
|  | 4 | 3.28 | 5.34 |
| A | 1* | 2.11 | |
|  | 2 | 4.57 | |
|  | 3 | 0.45 | |
|  | 4 | 5.14 | 3.07 |
| B | 1* | 0.08 | |
|  | 2 | 3.21 | |
|  | 3 | 3.05 | |
|  | 4 | 4.19 | 2.63 |
| C | 1* | 0.00 | |
|  | 2 | 0.58 | |
|  | 3 | 0.70 | |
|  | 4 | 0.31 | 0.40 |
| N | 1* | 0.40 | |
|  | 2 | 0.23 | |
|  | 3 | 0.14 | |
|  | 4 | 0.65 | 0.35 |
| E | 1* | 2.39 | |
|  | 2 | 4.53 | |
|  | 3 | 4.62 | |
|  | 4 | 5.51 | 4.26 |

COMPARATIVE EXAMPLE 15

As procedure was developed to assess the quality (the straightness of the cut through the carpet composite) as well as the "true-ness" of the shape of the cut on a side.

1. Samples are prepared by using a die cutter to cut representative pieces from a carpet square on the seams of interest. Note that the seam to be assessed (the commercially cut edge) is not touched by the die, unless a die cut seam is the desired joint.
2. Along the seam joint of interest, the tuft yarns are shaved off of the face of the carpet to insure that they do not interfere with the measurement. These yarns are shaved off to a distance of at least ½ inch from the carpet edge of interest.
3. Two carpet tile edges are placed face down on a light box (we used The Back Light, Model HPE1218, by Hall Productions) so that the light box will illuminate the seam formed by the tile edge of interest. Any places along the seam where the edges of the tile do not come into direct contact will allow light to transmit through the joint.
4. The seam with the light box backlight is imaged with a CCD camera. We used a Javelin Electronics Chromachip II model JE3462RGB camera in manual mode. The illumination levels of the digital image were set using the iris on the camera lens. The RGB histogram of the image was checked in Adobe Photoshop 6.0 to make sure none of the pixels were clipped at 0 or 255 (8 bit data storage). The data was converted to Adobe Lab color model. The light passing through the seams was adjusted so that its Adobe L value was as close to 255 without clipping the signal. The camera was placed 28 inches above the sample and captured 480×640 pixel resolution.
5. To insure correct spatial calibration, a ruler was imaged in the horizontal and vertical directions of the image. This allows a correspondence between pixel values and length.
6. To insure good digital contrast between the light exiting the seam and the backing of the carpet tile, black construction paper (in the shape of the seam) was placed over the back of the carpet tile (average digital count value of 70 and all values <128) in such a way to cover as much of the carpet backing as possible without clipping the light transmitting through the seam.

7. The two pieces of carpet tile are compressed together by hand with light force and then slowly released.
8. An image is captured of the resulting seam, converted to Adobe Lab color model and split into it separate L, a, and b images. The L image alone was used for the assessment.
9. Image Pro Plus 4.5 was used to count the number of pixels with digital count greater than 128 (representing transmitting intensity through the seam). This actually is an area calculation but it directly correlates to number of pixels. The software was also used to measure the length of the seam.
10. Using the area of light pixels (areas where there is not good contact between seams) and the length of the seam imaged, the average width of non-contact per seam length is calculated.

The results of this assessment are presented graphically in FIG. 27.

COMPARATIVE EXAMPLE 16

In order to evaluate the relative bulk of the pile face on various samples the normal pile layer height was measured from the primary backing to the top of the pile yarns. The average fully extended yarn length from the primary backing was also measured. A Bulk Index was then calculated as the ratio of the extended yarn length to the normal pile height. The standard pile density was then calculated using the following formula.

m/p where:

m=calculated mass of yarn above primary backing in one square yard based upon shaving representative areas; and p=height of pile in yards The results of the analysis for various samples are set forth in the following table.

| | Pile Bulk Character | | | |
|---|---|---|---|---|
| Sample | Pile layer height under normal conditions (inches) | Extended Yarn length above primary backing (inches) | Ratio of extended yarn length divided by pile layer height | Standard Pile Density based on pile layer height under normal conditions (oz/cubic yd) |
| A | 0.386 | 0.43 | 1.11 | 2607 |
| B | 0.426 | 0.45 | 1.06 | 2547 |
| C | 0.256 | 0.275 | 1.07 | 1799 |
| D | 0.418 | 0.6 | 1.44 | 2504 |
| E | 0.28 | 0.3 | 1.07 | 4357 |
| F | 0.433 | 0.6 | 1.39 | 2354 |
| G | 0.543 | 0.63 | 1.16 | 2749 |
| H | 0.276 | .6* | 2.17 | 2311 |
| I | 0.539 | 0.55 | 1.02 | 2025** |
| J | 0.304 | 0.34 | 1.12 | 2919** |
| K | 0.181 | 0.41* | 2.27 | 5850** |
| L | 0.173 | 0.32* | 1.85 | 2091 |
| M | 0.165 | 0.18 | 1.09 | 1455 |
| N | 0.15 | 0.28* | 1.87 | 1908 |
| O | 0.177 | 0.19 | 1.07 | 6893 |

*Loop cut and measured
**Value reported by manufacturer based on certified pile weight

COMPARATIVE EXAMPLE 17

Two tiles of each sample were cut about 6" wide and 10" long, leaving one 6" edge from the outside edge of the original tile unmodified. Two unmodified edges were placed together to form a seam and held in place. A MTS Sintech 1/S materials testing system with a 5.62 lb. load cell was used to pull a Long Tooth Undercoat Rake Just for Dogs across the seam at 3.94 inches/minute. The rake weighs 3.1 ounces and has 20 teeth ¹¹⁄₁₆" long evenly spaced along a 3⅞" length. The rake was pulled across the seam such that the row of teeth was parallel to the seam for a total length of six inches. The force needed to maintain the constant speed was recorded and plotted as a function of position, where the initial position is the zero point. The Testworks 4 software package was used to collect the data, and three data sets were averaged for each sample.

The data were analyzed using Igor. The first inch of the scans was disregarded, since that portion of the data indicates the force needed to set the rake in motion initially. The global maximum value of the force function was found, and then tie local minimum just before the maximum was identified. The difference between these two force values is called the "amplitude". The "amplitude" was then divided by the standard deviation of the force function between the 1" and 6" values. This quotient is called the "seam strength".

The results are set forth in the following table and demonstrate a superior seam in the exemplary product.

| Samples | Amplitude | Stddev | Strength |
|---|---|---|---|
| E | 92.2 | 13.4 | 6.8806 |
| D | 55.2 | 25.4 | 2.17323 |
| C | 135.7 | 23 | 5.9 |
| A | 136.3 | 24.1 | 5.6556 |
| B | 96.4 | 21.5 | 4.48372 |
| O | 13.44 | 8 | 1.68 |
| N | 90.4 | 14.4 | 6.27778 |

While the modular products of the present invention are not limited to carpet tiles for residential use, it is in accordance with at least one embodiment of the present invention that carpet tiles have special applicability to the residential market and, in particular, in the living room and bed rooms of homes as a replacement for broadloom carpet over broadloom pad. In this particular embodiment, it is preferred that the carpet tiles provide a carpet tile installation which substantially looks and feels like broadloom carpet over pad.

Also, in accordance with at least one embodiment of the present invention, the carpet product or construction of the present invention may be in the form of tiles, runners, mats, sheets, area rugs, roll product, and the like. For example, 18"×18" tiles, 24"×24" tiles, 36"×36" tiles, 4'×6' sheets, 4'×8' sheets, 4'×12' sheets, 2'×20' rolls, 3'×20' rolls, 4'×20' rolls, 6'×20' rolls, and the like.

In accordance with at least one embodiment, the modular product of the present invention is preferably flexible enough to be used on stairs, around corners, and the like. For example, 2'×20' stair runners that match with the 23"×23" carpet tiles.

In accordance with yet another embodiment, a system or line or products is provided including carpet tiles, carpet sheets, carpet rolls, and the like which have piles, yarns, patterns, designs, or colors which match or coordinate with other broadloom carpet products, so that one can select matching or coordinating flooring from a full line of carpet type flooring products.

Commonly owned U.S. patent application Ser. No. 10/198238 filed Jul. 18, 2002, entitled "Residential Carpet Product and Method" and Ser. No. 10/154,187, filed May 23, 2002, are each hereby incorporated by reference herein, and in international application no. PCT/US02/22854, filed Jul. 18, 2002, is hereby incorporated by reference herein It is to be understood that while the present invention has been illustrated and described in relation to potentially preferred embodiments, constructions and practices, that such embodiments, constructions and practices are intended to be illustrative only and that the invention is in no event to be limited thereto. Rather, it is contemplated that modifications and variations embodying the principles of the present invention will no doubt occur to those of skill in the art and it is therefore contemplated and intended that the present invention will extend to all such modifications and variations as may incorporate the broad principles of the present invention.

What is claimed is:

1. A flooring system for use in a residential environment comprising:
a plurality of modular surface covering elements including a plurality of edges, wherein the modular surface covering elements are configured for disposition in edge to edge covering arrangement across at least a portion of a subfloor, the modular surface covering elements comprising a pile fabric face including a primary base and a plurality of yarns projecting outwardly from the primary base defining a pile layer for contact by a user, the modular surface covering elements further comprising at least one layer of cushioning material secured in substantially fixed positional relation relative to the pile fabric face at a position below the pile fabric face and wherein the pile layer has a standard pile density in the range of about 500 to about 4,200 ounces per cubic yard and wherein the plurality of yarns projecting outwardly from the primary base have an average extended length above the primary base in the range of about 0.25 to about 1 inch, wherein each of the modular surface covering elements in the flooring system are of substantially Identical geometry and comprise an elongate construction including two substantially straight lateral sides extending between a single outwardly projecting chevron end a single inwardly projecting chevron, wherein the inwardly projecting chevron is disposed in substantial alignment with the outwardly projecting chevron such that the Inwardly projecting chevron of any one of the modular surface covering elements in the flooring system is mateable in interlocking relation with the outwardly projecting chevron of an abutting modular surface covering element in the flooring system.

2. The invention as recited in claim 1, wherein at least one of said modular surface covering elements has a friction enhancing coating on the bottom thereof.

3. The invention as recited in claim 1, wherein said layer of cushioning material includes at least one layer of rebond foam.

4. The invention as recited in claim 1, wherein said layer of cushioning material includes at least one layer of virgin, filled, polyurethane foam.

* * * * *

UNITED STATES PATENT AND TRADEMARK OFFICE
CERTIFICATE OF CORRECTION

| | |
|---|---|
| PATENT NO. | : 7,182,989 B2 |
| APPLICATION NO. | : 10/209050 |
| DATED | : February 27, 2007 |
| INVENTOR(S) | : Kenneth B. Higgins, N. David Sellman, Jr. and William Tippett |

It is certified that error appears in the above-identified patent and that said Letters Patent is hereby corrected as shown below:

Column 37, line 24, delete --in--.

Column 38, line 19, delete "Identical" and add --identical--.

Column 38, line 23, after "ron" delete "end" and add --and--.

Column 38, line 26, after "the" delete "Inwardly" and add --inwardly--.

Signed and Sealed this

First Day of May, 2007

JON W. DUDAS
*Director of the United States Patent and Trademark Office*